(12) United States Patent
Kan

(10) Patent No.: US 8,375,151 B1
(45) Date of Patent: Feb. 12, 2013

(54) COMMAND PORTAL FOR SECURELY COMMUNICATING AND EXECUTING NON-STANDARD STORAGE SUBSYSTEM COMMANDS

(75) Inventor: Alan Kan, Diamond Bar, CA (US)

(73) Assignee: Siliconsystems, Inc., Aliso Viejo, CA (US)

( * ) Notice: Subject to any disclaimer, the term of this patent is extended or adjusted under 35 U.S.C. 154(b) by 338 days.

(21) Appl. No.: 12/425,992

(22) Filed: Apr. 17, 2009

Related U.S. Application Data

(63) Continuation of application No. 12/370,420, filed on Feb. 12, 2009.

(51) Int. Cl.
  G06F 13/28 (2006.01)
  G06F 3/00 (2006.01)
(52) U.S. Cl. ............... 710/28; 710/5; 710/24; 711/146; 726/3; 726/4
(58) Field of Classification Search .............. 710/28
  See application file for complete search history.

(56) References Cited

U.S. PATENT DOCUMENTS

| | | | |
|---|---|---|---|
| 6,112,319 A | | 8/2000 | Paulson |
| 7,334,077 B2 | | 2/2008 | Nassar |
| 2002/0081994 A1 | * | 6/2002 | Aoyagi .................. 455/411 |
| 2007/0136501 A1 | * | 6/2007 | Chang et al. .............. 710/105 |
| 2007/0168668 A1 | | 7/2007 | Chang et al. |
| 2008/0086613 A1 | * | 4/2008 | Mosek et al. .............. 711/163 |

OTHER PUBLICATIONS

Office Action dated Apr. 12, 2011 in related U.S. Appl. No. 12/370,420 in 12 pages.
Office Action dated Oct. 4, 2011 from U.S. Appl. No. 12/370,420, 12 pages.

* cited by examiner

*Primary Examiner* — Henry Tsai
*Assistant Examiner* — Dean Phan
(74) *Attorney, Agent, or Firm* — Knobbe Martens Olson & Bear LLP

(57) ABSTRACT

A command portal enables a host system to send non-standard or "vendor-specific" storage subsystem commands to a storage subsystem using an operating system (OS) device driver that does not support or recognize such non-standard commands. The architecture thereby reduces or eliminates the need to develop custom device drivers that support the storage subsystem's non-standard commands. To execute non-standard commands using the command portal, the host system embeds the non-standard commands in blocks of write data, and writes these data blocks to the storage subsystem using standard write commands supported by standard OS device drivers. The storage subsystem extracts and executes the non-standard commands. The non-standard commands may alternatively be implied by the particular target addresses used. The host system may retrieve execution results of the non-standard commands using standard read commands. The host-side functionality of the command portal may be embodied in an API that is made available to application developers.

16 Claims, 16 Drawing Sheets

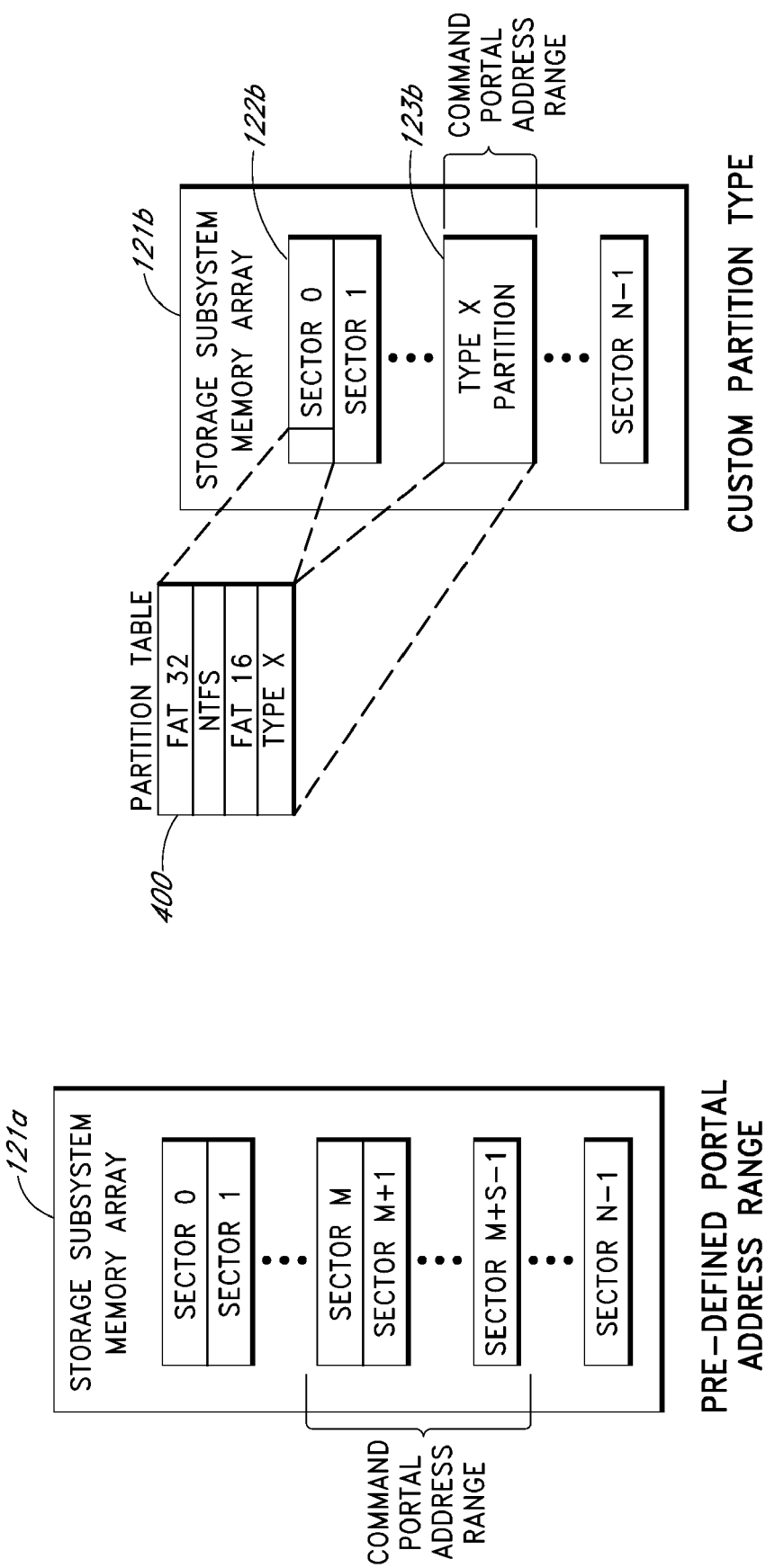

COMMAND PORTAL FOR SECURELY COMMUNICATING AND EXECUTING NON-STANDARD STORAGE SUBSYSTEM COMMANDS

CROSS-REFERENCE TO RELATED APPLICATIONS

This application is a continuation of U.S. patent application Ser. No. 12/370,420, filed Feb. 12, 2009, which claims the benefit of U.S. Provisional Patent Application No. 61/086,723, filed Aug. 6, 2008. The entireties of both above-referenced applications are hereby incorporated by reference herein and made a part of the present disclosure.

BACKGROUND

1. Technical Field

The present invention relates to storage subsystems, and more specifically, to storage subsystems that implement both standard and non-standard commands.

2. Description of the Related Art

Storage subsystems are widely used to store various types of data. An operating system ("OS") device driver, executed on a host system, performs input and output ("I/O") commands to communicate with a storage subsystem. Conventionally, OS device drivers for storage subsystems support a standard storage interface command set, such as an Advanced Technology Attachment ("ATA"), Serial ATA ("SATA"), SCSI, USB, RS232/423, PCMCIA, Firewire (IEEE-1394), FibreChannel, or PCI Express command set.

Often, it is advantageous for a storage subsystem to support one or more non-standard or "vendor-specific" commands that are not part of a standard command set. These vendor-specific commands may be implemented using unassigned command opcodes of the standard interface, and may provide access to non-standard features of the storage subsystem. For example, a storage subsystem may implement vendor-specific commands for enabling a host to retrieve usage statistics data, retrieve other device state information, purge the subsystem's memory array, or provide data security.

Conventional approaches for implementing vendor-specific commands typically rely on creating, and installing on the host computer, a custom OS device driver that supports one or more particular vendor-specific commands. Typically, different versions of the custom OS device driver must be created for different operating systems such as Windows, MacOS and Linux, and often for different versions of the same operating system. This typically involves the burdensome tasks of rewriting the driver code to support each desired operating system (or version thereof), debugging the code, and distributing, installing, and periodically upgrading custom OS device drivers. This process may be further complicated if the provider of the OS requires certification of the custom OS drivers, or does not provide access to the device driver source code.

SUMMARY

A command portal is disclosed that enables a host system to send non-standard or "vendor-specific" storage subsystem commands to a storage subsystem using an OS device driver that does not support or recognize such non-standard commands. The architecture thereby reduces or eliminates the need to develop custom device drivers that support the storage subsystem's non-standard commands. To execute non-standard commands using the command portal in one embodiment, the host system embeds the non-standard commands in blocks of write data, and writes these data blocks to the storage subsystem using standard write commands supported by standard OS device drivers. The storage subsystem extracts and executes the non-standard commands. The non-standard commands may alternatively be implied by the particular target addresses used, such that non-standard commands need not be embedded in the write data. The host system may retrieve execution results of the non-standard commands using standard read commands. The host-side functionality of the command portal may be embodied in an Application Program Interface (API) that is made available to application developers.

In some embodiments, command validation and security protocol is further implemented to provide for both command validation and protection against malicious triggering of vendor-specific commands to destroy data stored on the storage subsystem. In some embodiments, command validation and security protocol determines whether the received vendor-specific command is communicated by a trusted host system and whether the command is properly formatted and its execution is permissible. In some embodiments, this is performed by exchanging authentication and validation codes (or signatures) between the host system and the storage subsystem to establish that both support the execution of vendor-specific commands. In some embodiments, the exchanged signatures are generated at least in part based on the received signatures.

In some embodiments, signatures are used for validating the non-standard storage subsystem command received by the storage subsystem. In some embodiments, validating the non-standard command comprises determining whether received write data contains a signature. The signature can, for example, be a particular pattern of bits (contiguous or non-contiguous), and can be inserted in a predefined location in the write data. Multiple different signatures can be used. In some embodiments, the signature can be generated based on a confirmation code received from the storage subsystem after execution of the previous non-standard command.

BRIEF DESCRIPTION OF THE DRAWINGS

Preferred embodiments of the invention will now be described with reference to the drawings summarized below. These drawings and the associated description are provided to illustrate preferred embodiments of the invention, and not to limit the scope of the invention.

DETAILED DESCRIPTION OF PREFERRED EMBODIMENTS

A storage subsystem command portal, and associated components that may be implemented by a host system, will now be described with reference to the drawings. Where possible, the same reference numbers are used throughout the drawings to refer to the same or like components. This description is intended to illustrate certain preferred embodiments, but other embodiments that are apparent to those of ordinary skill in the art, including embodiments which do not provide all of the benefits and features set forth herein, are also within the scope of this invention. As one example, some embodiments may omit some or all of the security features described herein. Thus, nothing in this detailed description is intended to suggest that any particular feature or component is essential. The invention is defined by the claims.

I. EXISTING APPROACHES TO SUPPORTING VENDOR-SPECIFIC COMMANDS

This section describes a typical environment in which the various inventive features may be employed, and describes some of the significant problems with existing approaches to executing vendor-specific commands.

Figure 1A:
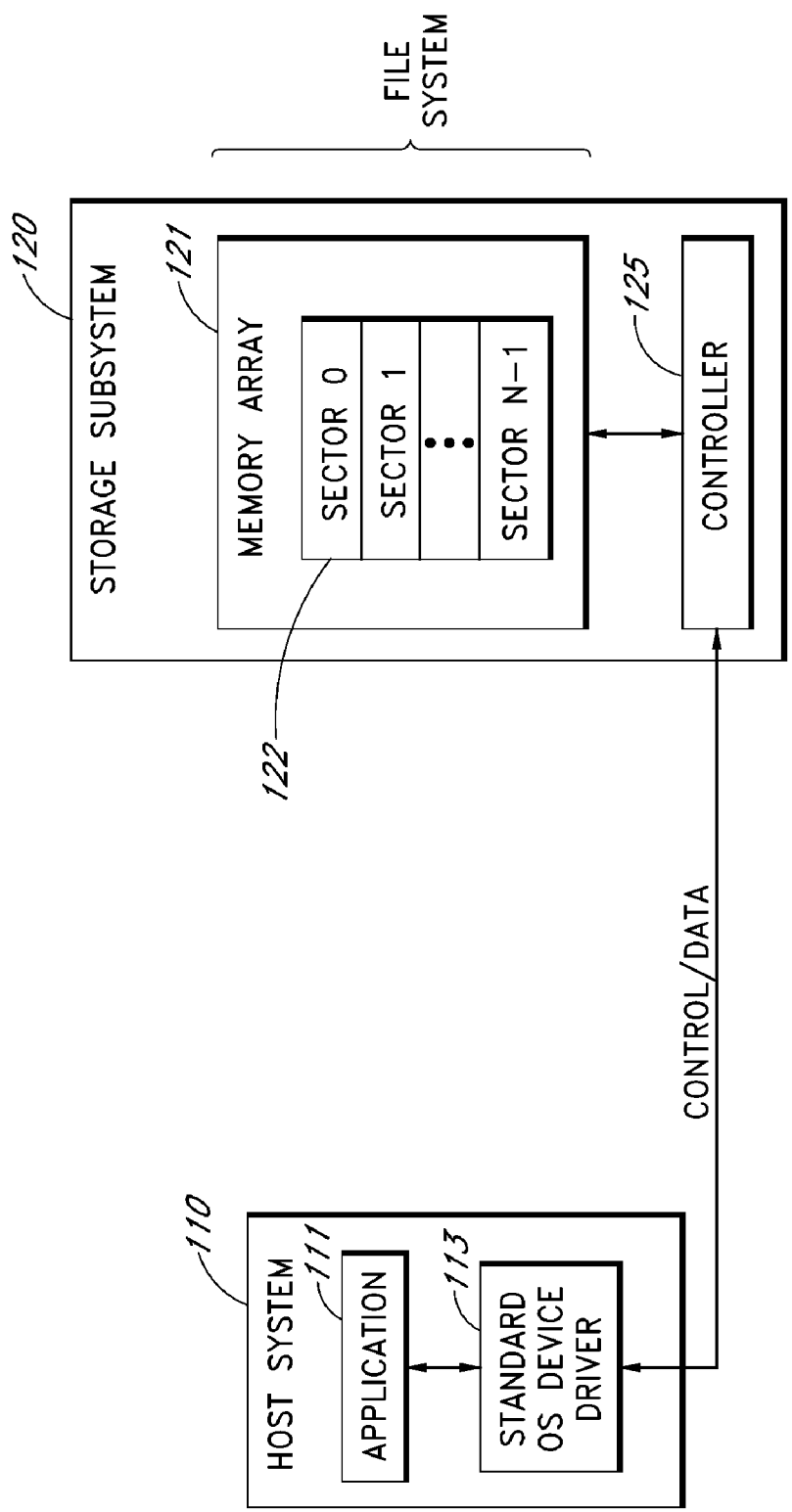
FIG. 1A is a block diagram showing how a storage subsystem may interface with a host system according to the prior art.
Figure 1B:
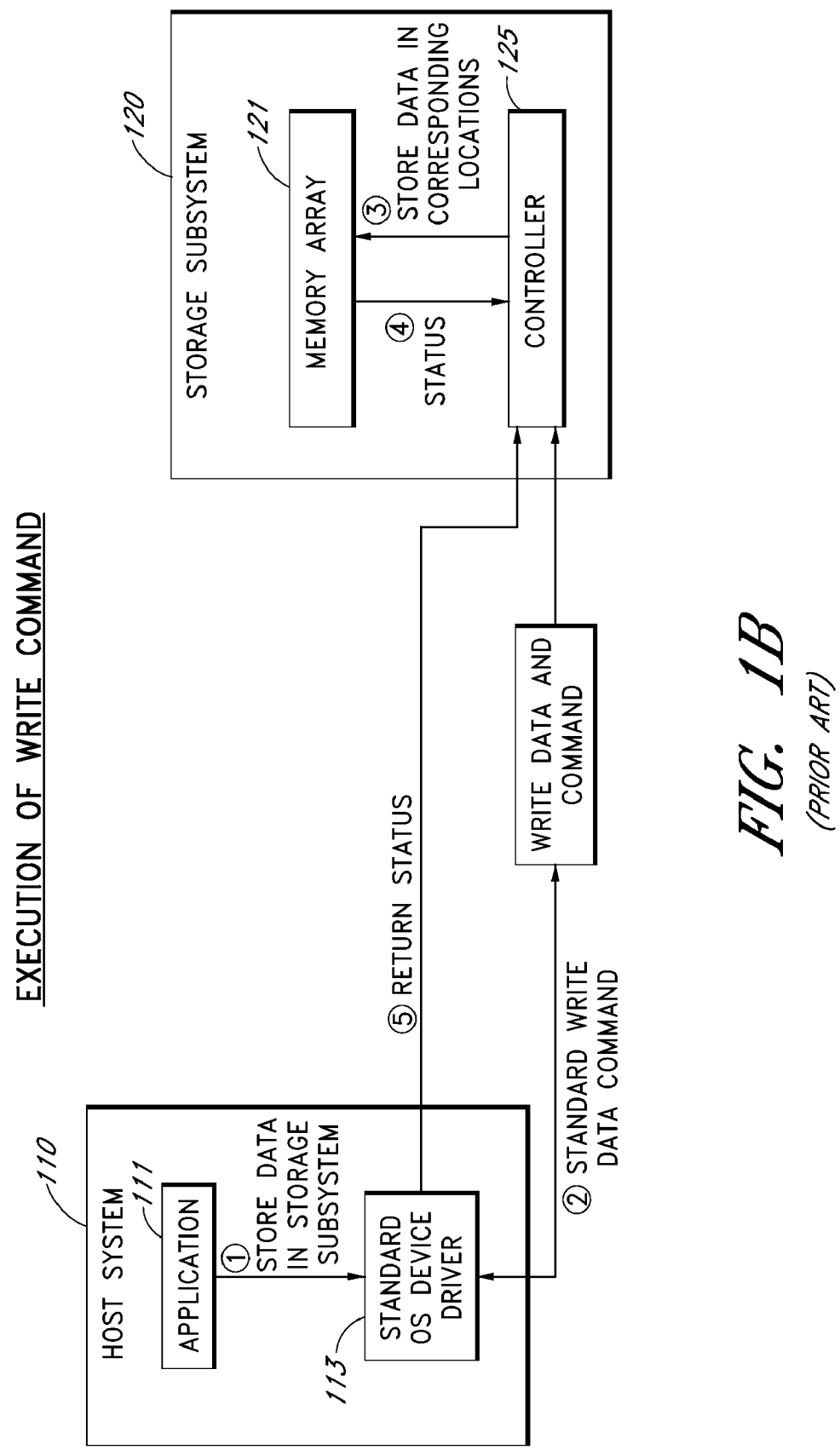
FIGS. 1B and 1C illustrate how write and read commands (respectively) are processed in the prior art system of FIG. 1A.
Figure 1C:
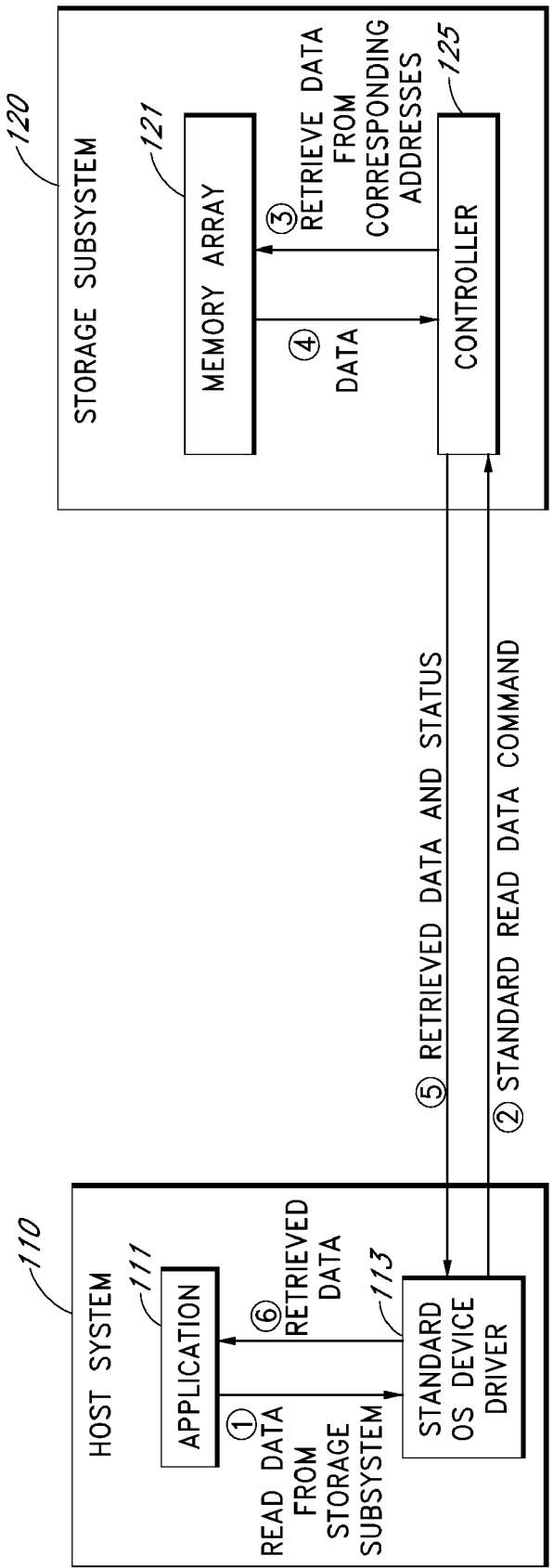

FIGS. 1A-1C are block diagrams illustrating a host system 110 connected to a non-volatile storage subsystem 120 according to the prior art. As shown in FIG. 1A, the host system 110 comprises a computer such as a personal computer, workstation, router, blade server or other type of computing device. The host system 110 executes applications 111 that store data in the storage subsystem 112. The host system 110 executes a standard OS device driver program 113 that provides functionality for communicating with the storage subsystem 120 by issuing commands in accordance with a specific storage interface, including but not limited to ATA, SATA, SCSI, USB, RS232/423, PCMCIA, Firewire, Fibre Channel, PCI Express bus, SD, MMC, or MMC Plus.

The storage subsystem 120 comprises a controller 125 and a storage subsystem memory array 121. The memory array 121 may be formatted according to a particular storage file system, including but not limited to FAT, FAT32, NTFS, HFS, HFS+, ext, ext2, ext3, ext4, JFFS, JFFS2, LogFS, or YAFFS. The memory array 121 is arranged in sectors 122. The controller 125 is configured to write data to and read data from the memory array 121 in response to commands from the host 110. Specifically, the controller 125 is configured to execute standard commands in accordance with the specific storage interface and associated communication protocol supported by the host 110.

As shown by event 1 in FIG. 1B, when an application 111 running on the host system 110 wishes to store user data in the storage memory array 121, it informs the standard OS device driver 113 (for example, via a Copy File command), and specifies the value of data to be stored and destination locations. (The term "user data" refers generally ordinary data that is stored on the storage subsystem in storage locations that are available to host applications 111, as opposed, e.g., to data stored in restricted storage locations and used for custom storage subsystem operations.) In event 2, the standard OS device driver 113 executes a "write data" command in accordance with the specific storage interface it supports. If a register-based ATA interface is used, this typically involves writing a "write data" command opcode to the ATA command register, and writing user data into the ATA data buffer 512 bytes at a time. Similarly, if a message-based SATA interface is used, this write command may be performed by writing user data into specific offsets of an SATA frame and transmitting the frame to the storage subsystem 120. The controller 125 receives the write data command from the standard OS device driver 113, and, and in event 3, stores the user data at the specified destination locations. Finally, in events 4 and 5, the status of the storage operation is returned to the host system 110.

As shown by event 1 in FIG. 1C, when an application 111 running on the host system 110 wishes to retrieve user data from the file system/memory array 121, it informs the standard OS device driver 113 (for example, via an Edit File command) and specifies the target locations. In event 2, the standard OS device driver 113 sends a standard "read data" command in accordance with the specific storage interface it supports. The controller 125 receives the read data command, and in event 3 and 4, retrieves user data from the specified locations. In event 5, the controller, returns this data along with the status of the read operation to the host system 110. If a register-based ATA interface is used, the controller 125 may store the retrieved user data into a data buffer, and the standard OS device driver 113 may retrieve this data (512 bytes at a time) upon receiving status indicating that the data is ready. If a message-based SATA interface is used, the controller 125 writes the retrieved user data into specific offsets of an SATA frame, and transmits the frame to the host system 110.

To execute vendor-specific commands that are not part of the standard storage interface command set, the standard OS device driver 113 typically needs to be customized to pass non-standard command opcodes and parameters between the host system 110 and the storage subsystem 120, and to interpret the results of execution. For example, according to a register-based ATA protocol, to send a vendor-specific command, the vendor may choose a unique 8-bit opcode that is not used by any of the standard ATA commands. The custom OS device driver sends this 8-bit opcode to the ATA command register and writes vendor-specific command parameters into the other ATA registers and/or the ATA data buffer (512 bytes at a time). The storage subsystem controller detects the opcode in the ATA command register, retrieves the parameters from the other ATA registers and/or the ATA data buffer, executes the vendor-specific command, and returns status and results in the other ATA registers and/or the ATA data buffer. Similarly, according to a message-based SATA protocol, the custom OS device driver transmits the opcode and parameters of a vendor-specific command by inserting their corresponding values at appropriate offsets of the SATA frame. The custom storage subsystem controller receives the SATA frame, executes the vendor-specific command, and returns status and results in another SATA frame.

The task of customizing a standard OS device driver 113 to execute vendor-specific commands can be difficult for a variety of reasons. For example, because OS device drivers are often tightly coupled to a particular operating system version, modifications to execute vendor-specific commands often require the developer to make separate changes for each version of an operating system. In addition, some operating system companies do not release their OS device driver source code, and/or impose restrictions on the ability of others to modify these device drivers. Although Microsoft partially addresses this issue by providing application programming interfaces ("APIs") for customizing standard Windows device drivers 113, these APIs are not implemented in all Windows versions and are not consistent across different versions. As another example, for register-based ATA interfaces, only a small number (e.g., 20 to 30) of unassigned opcodes are available for vendor-specific commands; this limits the vendor's ability to implement non-standard commands, and increases the likelihood of conflicts with the non-standard commands of other vendors.

II. COMMAND PORTAL ARCHITECTURE

An architecture will now be described that addresses at least some of the above problems by embedding non-standard commands, and responses to such commands, in data that is written to and read from the storage subsystem using standard commands. The architecture may be used with any of a variety of different standard storage interfaces and protocols, including but not limited to ATA, SATA, SCSI, USB, RS232/423, PCMCIA, Firewire, FibreChannel, PCI Express bus, SD, MMC, and MMC Plus. The term "command portal" is used in this description to refer generally and collectively to the architectural components that enable non-standard commands and responses to be embedded in the data stream.

Although the term "vendor-specific commands" is used throughout the following description for illustrative purposes, it will be recognized that the disclosed architecture can be used to transfer and execute any type of storage subsystem command. For example, the commands may be non-standard commands (i.e., commands not recognized by the underlying storage interface such as ATA) that are not specific to any particular vendor. Further, although referred to as "vendor-specific," the commands need not (and typically do not) comply with the vendor-specific command format of the underlying storage interface; for instance, where an ATA storage interface is used, the vendor-specific commands need not be communicated using the unassigned ATA opcodes ordinarily used for vendor-specific commands. The embedded, non-standard commands are also sometimes referred to in this disclosure as "custom commands."

Figure 2:
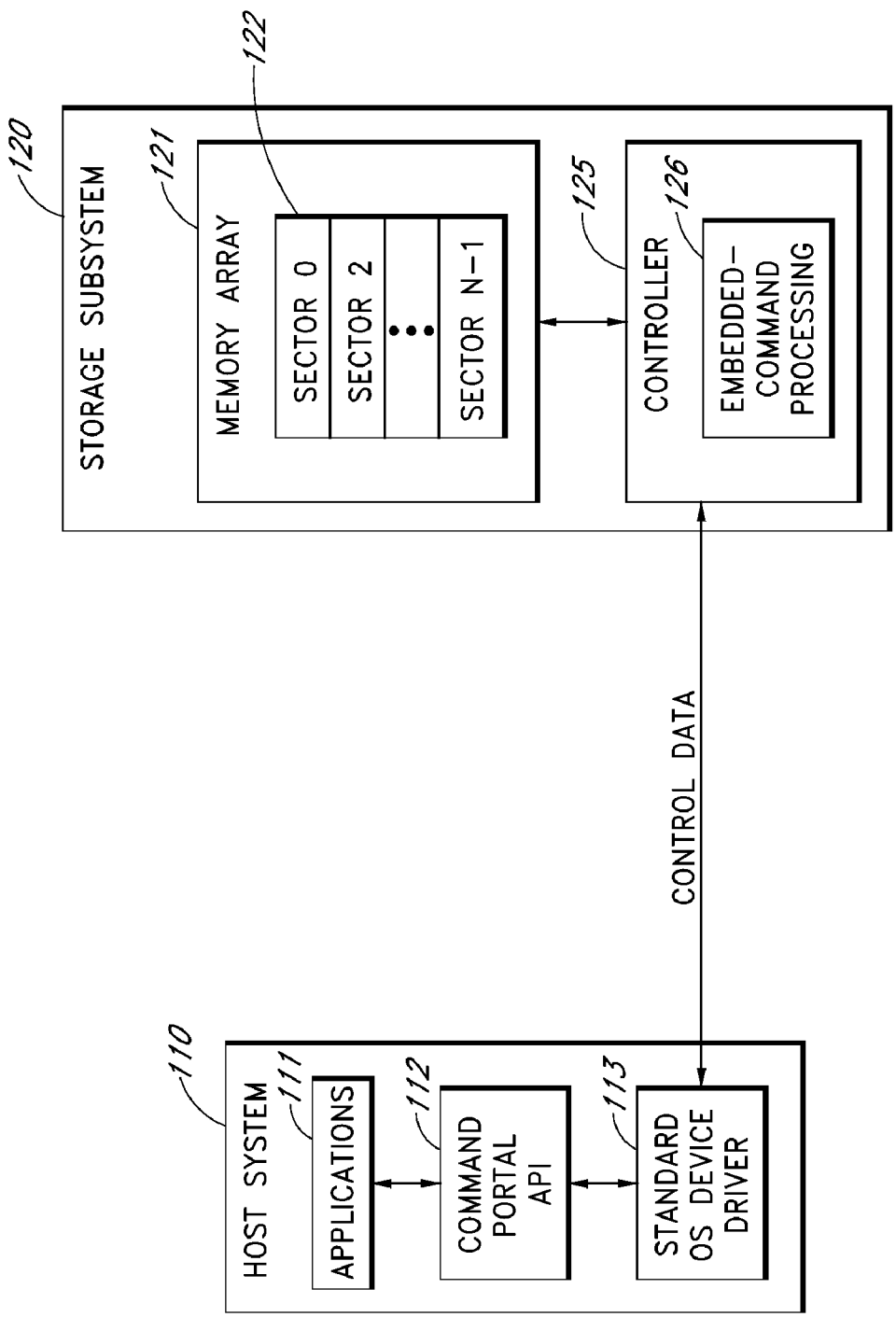
FIG. 2 is a block diagram illustrating a host system connected to a storage subsystem according to an embodiment of the invention.

FIG. 2 is a block diagram of a host system 110 connected to a non-volatile storage subsystem 120 according to an embodiment of the invention. The host system 110 comprises a computer such as a personal computer, workstation, router, blade server or other type of computing device. For example, the host system 110 may be a military system, a flight computer or other flight avionics system, a wearable computer used for military applications, a high-speed data recorder, a medical device, an industrial control system, an interactive kiosk, a personal digital assistant, a laptop computer, an interactive wireless communication device, a point-of-sale device, or the like. The host system 110 executes applications 111 that store user data and execute vendor-specific commands in the storage subsystem 120. The host system 110 executes a command portal API 112 that embeds vendor-specific commands within user data that is written to the storage subsystem 120 via a standard OS device driver 113. The command portal API is also responsible for extracting execution results of the vendor-specific commands from data read from the storage subsystem 120 by the standard OS device driver 113. The standard OS device driver 113 reads and writes the data to/from the storage subsystem 120 using standard storage access commands in accordance with a specific storage interface and associated communication protocol, as described in the previous section. The tasks of embedding vendor-specific commands and execution results in the data preferably occurs transparently to the standard OS device driver 113, meaning that the device driver 113 need not (and ordinarily does not) include any code for supporting these tasks.

The storage subsystem 120 comprises a controller 125 that accesses a non-volatile memory array 121. The memory array 121 may be formatted according to a particular storage file system, including but not limited to those mentioned above. As illustrated, all or a portion of the memory array 121 may be arranged into a plurality of sectors 122. A portion of the memory array (e.g., a particular group of sectors) may be "restricted" or "protected," meaning that it is not accessible to the host system 110 via standard read and write commands. Such restricted locations, if any, may be accessible to the host 110 via vendor-specific commands that are executed as described herein.

The controller 125 is configured to write data to, and read data from, the memory array 121 in response to commands from the host 110. The controller 125 implements both a standard storage command set (e.g., an ATA command set), and a set of one or more non-standard or "vendor-specific" commands that are communicated via the command portal. As illustrated, the controller 125 includes an embedded-command processing module 126 that implements the storage subsystem side of the command portal. With the exception of the command portal functionality described herein, the storage subsystem 120 of FIG. 2 may be identical in construction and operation to the prior art storage subsystem 120 described above with reference to FIGS. 1A-1C.

With further reference to FIG. 2, the controller 125, including the embedded-command processing module 126, may be implemented as a single integrated circuit (IC) device or multiple IC devices. For example, the controller may be implemented as an application-specific integrated circuit (ASIC) device, a field programmable gate array (FPGA) device, a microcontroller, a microprocessor, or some combination thereof. The various controller functions described herein, including those used to implement the command portal, may be implemented in firmware or other program instructions executed by the controller 125, and/or may be implemented in application-specific circuitry. The memory array 121 may consist of solid-state non-volatile memory devices, such as flash memory devices. Other types of memory elements, such as solid-state volatile RAM devices and magnetic disk drives, may additionally or alternatively be used.

Figure 3A:
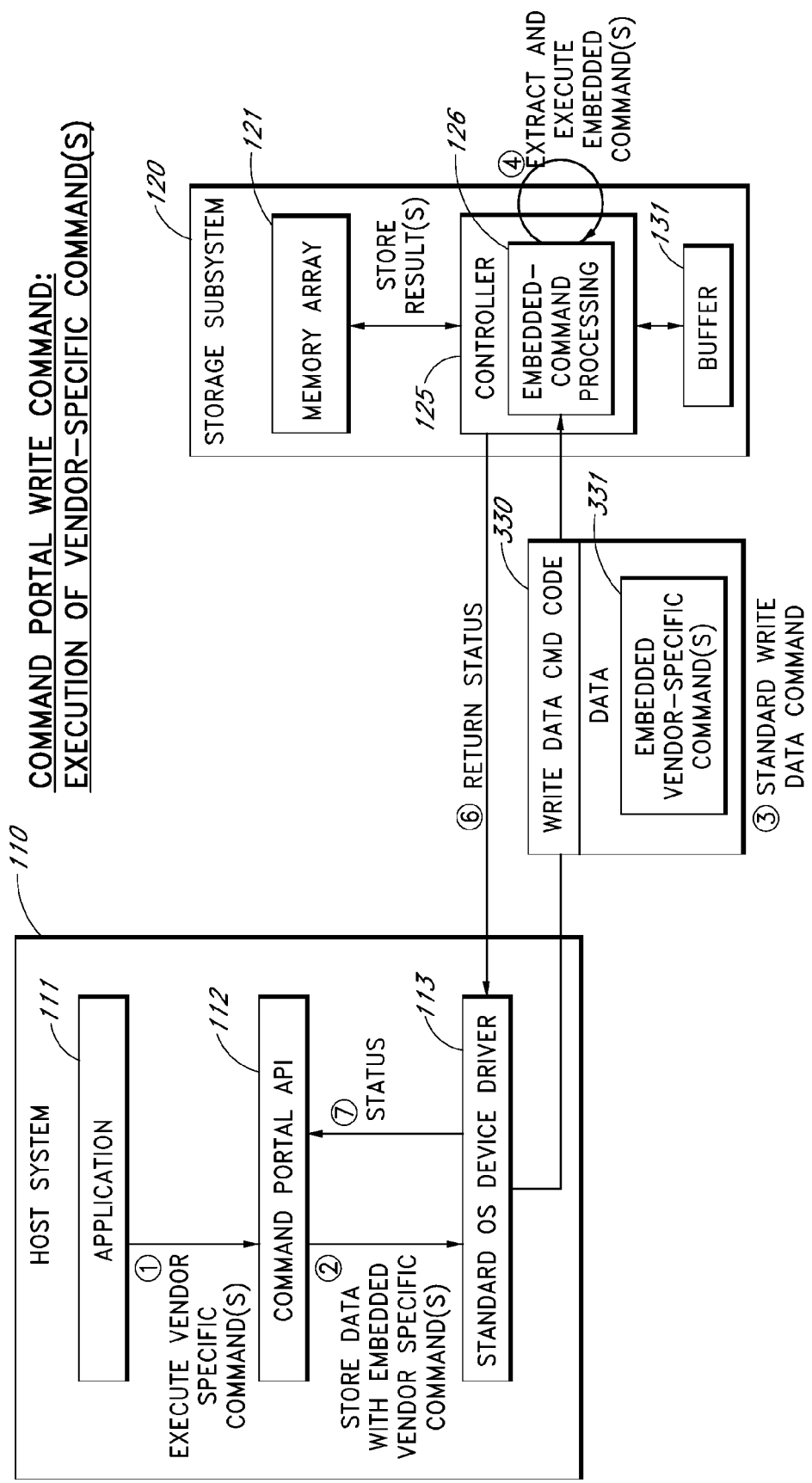
FIG. 3A is a flow diagram illustrating how non-standard or "vendor-specific" commands are executed in the system of FIG. 2.
Figure 3B:
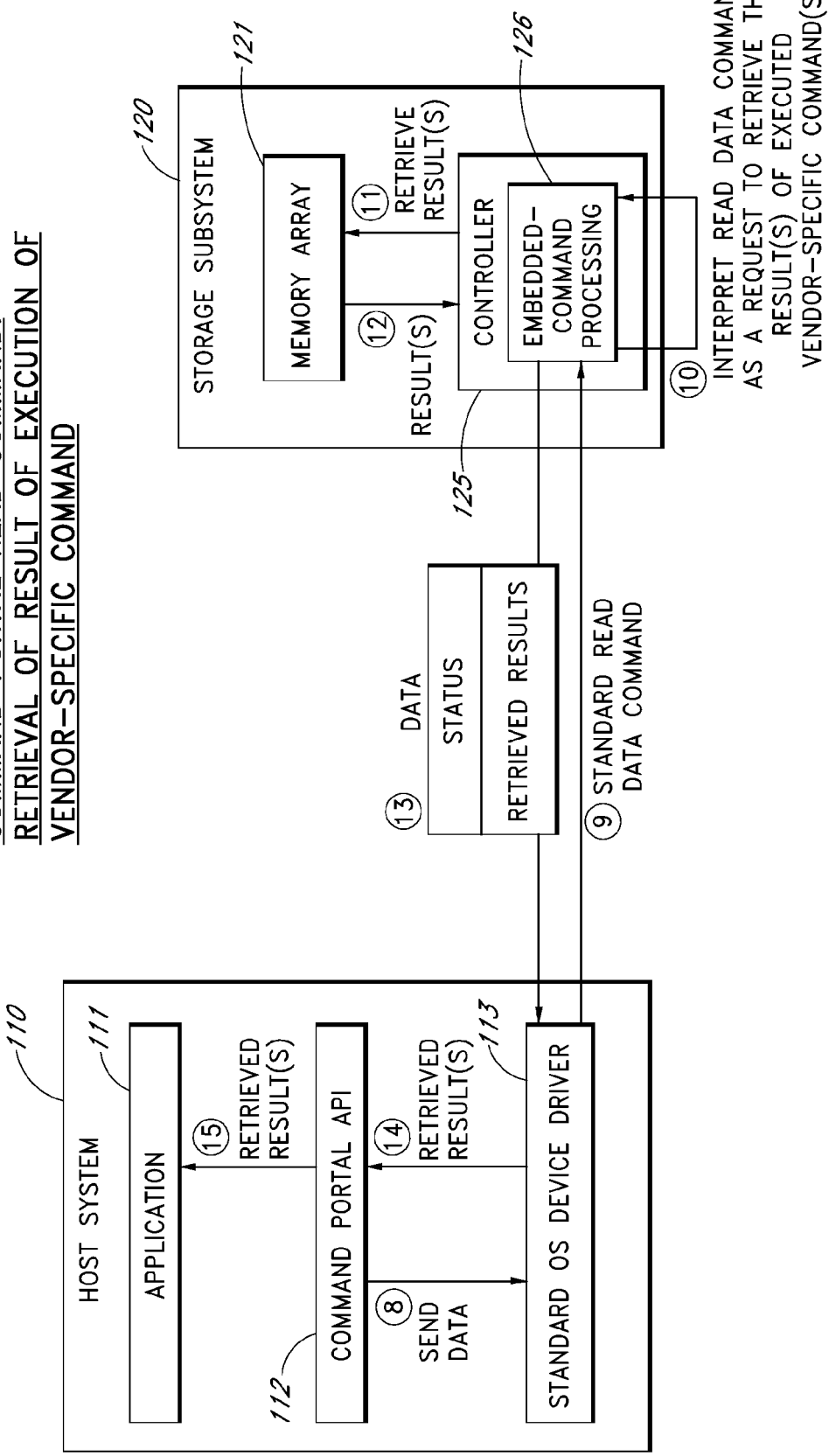
FIG. 3B is a flow diagram illustrating how an ordinary read command can be used to retrieve the execution results of a "vendor-specific" command in the system of FIG. 2.

FIGS. 3A and 3B illustrate how the system shown in FIG. 2 executes vendor-specific commands according to one embodiment. With reference to FIG. 3A, an application 111 running on the host system 110 requests the command portal API 112 to execute a vendor-specific command (event 1). The command portal API 112 responds by constructing a block of data that includes the embedded command, and by requesting the standard OS device driver 113 to store the data to the storage subsystem 120 (event 2). In the preferred embodiment, the vendor-specific command is embedded in a single 512-byte sector of data; in other embodiments, a single vendor-specific command may be spread out across multiple sectors of data. For purposes of this example, it is assumed that only a single vendor-specific command is embedded in the block or sector of data, although this need not be the case.

With further reference to FIG. 3A, the device driver 113 writes the block of data to the storage subsystem 120 using a standard write data command (event 3), or possibly a sequence of such commands. The standard write data command may, for example, be a standard ATA or SATA write data command as described above. The standard OS device driver 113 may process this write data command in exactly the same way as described above with reference to FIG. 1B. As is conventional, the storage system 120 may temporarily store the received block of data in a buffer 131.

The storage subsystem's controller 125 may determine whether the block of write data includes an embedded custom command based on the target address of the write command, based on content of the block of data, or both. As one example, if the write address falls in pre-specified or agreed-upon address range used for command portal operations, the controller 125 may check the data block for a particular pattern or signature that identifies the data block as having an embedded command. Examples of specific methods that may be used to reliably distinguish ordinary write operations from command portal write operations are described below.

Upon detecting that the data block includes an embedded ("vendor-specific" or "custom") command, the controller's embedded-command processing module 126 extracts and executes this command (event 4). As depicted by event 5, if applicable to the particular command executed, the controller 125 may write the execution results to the memory array/file system 121 (e.g., to a particular sector in the restricted memory area) for subsequent retrieval.

In a preferred embodiment, when an embedded command is detected by the controller 125 (event 4), the controller refrains from writing the block of data to the target sector or sectors to which the block is addressed. Thus, any preexisting data stored in the target sector or sectors is not overwritten. This feature enables sector addresses used to store ordinary data to also be used to pass "dummy" blocks of write data containing embedded commands. Alternatively, one or more particular sectors may be reserved for and dedicated to receiving data that contains embedded commands, in which case the target sector may be overwritten.

With further reference to FIG. 3A, the execution status of the write data command is returned to the standard OS device driver 113 in event 6. This status information may actually be reported back when the command is received and before it is executed. Ordinarily, the execution "status" returned in event 6 indicates that the write operation completed successfully—even though the requested sector write operation may actually be blocked by the controller 125 as described above. Thus, from the perspective of the standard OS driver 113, the sector write operation appears to complete successfully, even though the data preferably is not actually written to the target sector of the memory array 121. In event 7, the standard driver 113 communicates the execution status to the command portal API 112.

The process depicted in FIG. 3A may be modified such that no vendor-specific command data is actually embedded in the write data. Specifically, particular vendor-specific commands can be associated, respectively, with particular sectors/addresses of the memory array 121. When a write is performed to one of these addresses, the storage subsystem 120 may use the address itself as the identifier of the vendor-specific command to be executed. Commands specified in this manner are called "implied commands," and are discussed further below.

FIG. 3B illustrates a process by which the host system 110 may retrieve the execution results (if any) of the embedded (or implied) vendor-specific command or commands. The illustrated sequence of events may occur immediately after the event sequence of FIG. 3A, or at some later point in time. In event 8, the command portal API 112 requests the standard OS device driver 113 to read data stored in the storage subsystem. In event 9, the standard OS device driver 113 responds by sending a standard read command to the storage subsystem 120. The controller 125 treats the read command as a request to retrieve the execution results of the prior vendor-specific command or commands, and invokes the embedded command processor module 126. In events 12 and 13, the execution results are retrieved from the memory array 121 (and/or from another internal status storage mechanism such as registers or RAM) and are returned to the host system 110. Typically, the execution results are returned as single sector (512 bytes) of data, although the execution results may alternatively span multiple sectors of read data. In event 15, the command portal API 112 passes the execution results to the application 111.

As illustrated by the foregoing processes flows, the present architecture enables non-standard or "vendor-specific" commands to be executed without the need for a special device driver that supports such commands. Thus, the above-described problems associated with developing such custom device drivers are avoided or reduced.

As will be recognized, the processes shown in FIGS. 3A and 3B are also useful where the standard OS device driver 113 is replaced with a custom device driver that implements one or more vendor-specific commands. In such embodiments, vendor-specific commands supported by the custom device driver may be executed using conventional methods (i.e., without using the command embedding process of FIGS. 3A and 3B), while vendor-specific commands not supported by the device driver 113 may be executed as shown in FIGS. 3A and 3B.

In some environments, the host system 110 and storage subsystem 120 may be interconnected by one or more bridges, such as USB or SATA bridges. The existence of such bridges advantageously does not adversely affect the operation of the command portal architecture. This is because the vendor-specific commands and the execution results of such commands appear as ordinary read and write data to the bridges, and because the bridges do not modify such data.

III. COMMAND PORTAL ADDRESSES

To support the above-described features, the storage system implements at least one method or protocol for distinguishing requests to store or access user data (data without embedded vendor-specific commands) from requests to execute vendor-specific commands. One such method involves the use of a designated sector address, or range of sector addresses (which may, but need not, be contiguous), for write operations with embedded commands. This address or address range is referred to herein as the "command portal address range," and may also be used to retrieve execution results of embedded commands. As described below, an appropriate mechanism may optionally be used to block the host OS from using the command portal range to store ordinary data.

Although the command portal address range can consist of a single address (one sector), a range having multiple addresses is preferably used to support certain advanced functions. Examples of such advanced functions include the following: concurrent processing of multiple sectors that include embedded commands, command validation, support of implied commands without any parameters (see description below), and one-step data retrieval by directly reading from specific command portal addresses without first sending a read data command. As discussed below, although the command portal address range can be hard coded in both the storage subsystem 120 and host system 110, a non-hard-coded range that is identified via a discovery process is preferably used.

FIGS. 4A-4D illustrate several methods of choosing command portal addresses according to embodiments of the invention. In these embodiments, the storage subsystem's memory array 121 may be formatted according to a particular type of storage file system, including but not limited to those mentioned above. Each of the illustrated methods is discussed below. As will be recognized, any two or more of these methods can be used in combination in a given system. As will further be recognized, the use of designated command portal addresses is not essential; for example, with an appropriate command validation scheme, the entire address space of the memory array can be used for command portal operations.

Fixed Command Portal Addresses—FIG. 4A

FIG. 4A illustrates an embodiment in which a fixed set of one or more sectors/sector addresses is used as the command portal address range. Sectors M through M+S-1 form a predefined command portal address range of size S. The set of command portal addresses is hard coded in the storage subsystem 120, and is known a priori to the host system (e.g., by being encoded in the native code of the command portal API 112). The host system uses this set of addresses whenever writing data that includes an embedded custom command.

Several possible sector addresses are suitable for use as fixed command portal addresses. Address location 0 is the first location of the storage subsystem memory array, and all storage subsystem memory arrays have this address. Accordingly, address location 0 can be used without any query by the host system 110 as to the total capacity of the storage subsystem 120. Still, address location 0 is typically used to store Master Boot Record (MBR) data of the storage subsystem 120, and any accidental overwrite of its contents may be fatal to the operation of the storage subsystem 120. In addition, antivirus software being executed on the host system 110 may, in some cases, prohibit writing to address location 0.

Another option is to use the last valid address derived from the total configured capacity of the storage subsystem memory array or storage file system 121a. This choice avoids overlap with MBR data. Because the total configured capacity varies from one storage subsystem to another, the host system 110 may need to first discover the total configured capacity. In addition, in some cases, the last valid address is part of an uninitialized portion of the storage subsystem's memory array and must be initialized before being used as a command portal address.

Another address that can be used as a fixed command portal address is address location 1. Address location 1 is the second location of the storage subsystem memory array, and is present in practically all storage subsystems memory arrays. For most operating systems, address location 1 immediately follows the MBR data, and is typically neither reserved to store system information nor protected by antivirus software. Accordingly, address location 1 is a good choice for use as a predefined command portal address. Other valid address locations may be used as predefined command portal addresses, but there may be a risk of these locations being reserved to store system information and/or being protected by antivirus software.

The use of a predefined command portal address range is advantageous because no initialization is required before the host can perform command portal operations. This simplicity is useful where, for example, a storage subsystem memory array is uninitialized and requires a vendor-specific command from the host system to become initialized.

On the other hand, the use of a predefined range provides some disadvantages in comparison to other approaches described below. For example, the command portal addresses are not available to store user data. In addition, although most operating systems provide standard "write data" and "read data" APIs, to use them with host-specified storage subsystem addresses sometimes requires special user privileges, such as an "administrator privilege" for Windows or "raw disk" access for Linux. Despite these disadvantages, the use of fixed addresses represents a significant improvement over the current practice of developing custom OS device drivers.

Portal Address Discovery Using a Custom Partition Type—FIG. 4B

FIG. 4B illustrates how a custom partition type can be used to enable the host 110 to discover the command portal address or addresses for a particular storage subsystem 120. Generally, an operating system partition is defined by a partition type and partition address boundaries. The partition type denotes the type of file system according to which the partition is formatted. Partition types include but are not limited to FAT, FAT32, NTFS, HFS, HFS+, ext, ext2, ext3, ext4, JFFS, JFFS2, LogFS, or YAFFS. Partition address boundaries specify the beginning and ending addresses of the partition. The storage subsystem's memory array 121b can be formatted according to several different partitions, and partition table 400 (usually part of MBR data) stores partition information.

This approach involves the creation of a partition 123b of a custom partition type (for example, type X) that is distinct from common partition types, and which is therefore not recognizable by the host operating system. This partition 123b is used as all or a portion of the command portal address range. The custom partition type is known a priori to the command portal API 112.

A partition table 400 contains partition address boundaries of the special partition 123b. Both the host system 110 and storage subsystem 120 read the partition table 400 to determine if the custom partition type (for example, type X) is present. If a match if found, the corresponding address boundaries are read from the table 400 and used as command portal addresses. If no match is found, the command portal may be disabled. With this approach, the command portal address range can be changed by changing the partition address boundaries.

This use of a custom partition type for portal address discovery is advantageous because it is simple, flexible, and allows for switching off portal-based execution of vendor-specific commands (via, for example, removal of the custom partition). In addition, this method provides security because applications 111 will not be able to directly access the custom partition (since the host operating system does not recognize its type). One possible downside of this method is that it uses up one of the partition table entries (the MBR stores up to four partition entries). In addition, because the host directly specifies the target addresses, this method, like the "fixed addresses" method, may require special user privileges with some operating systems.

Figure 4C:
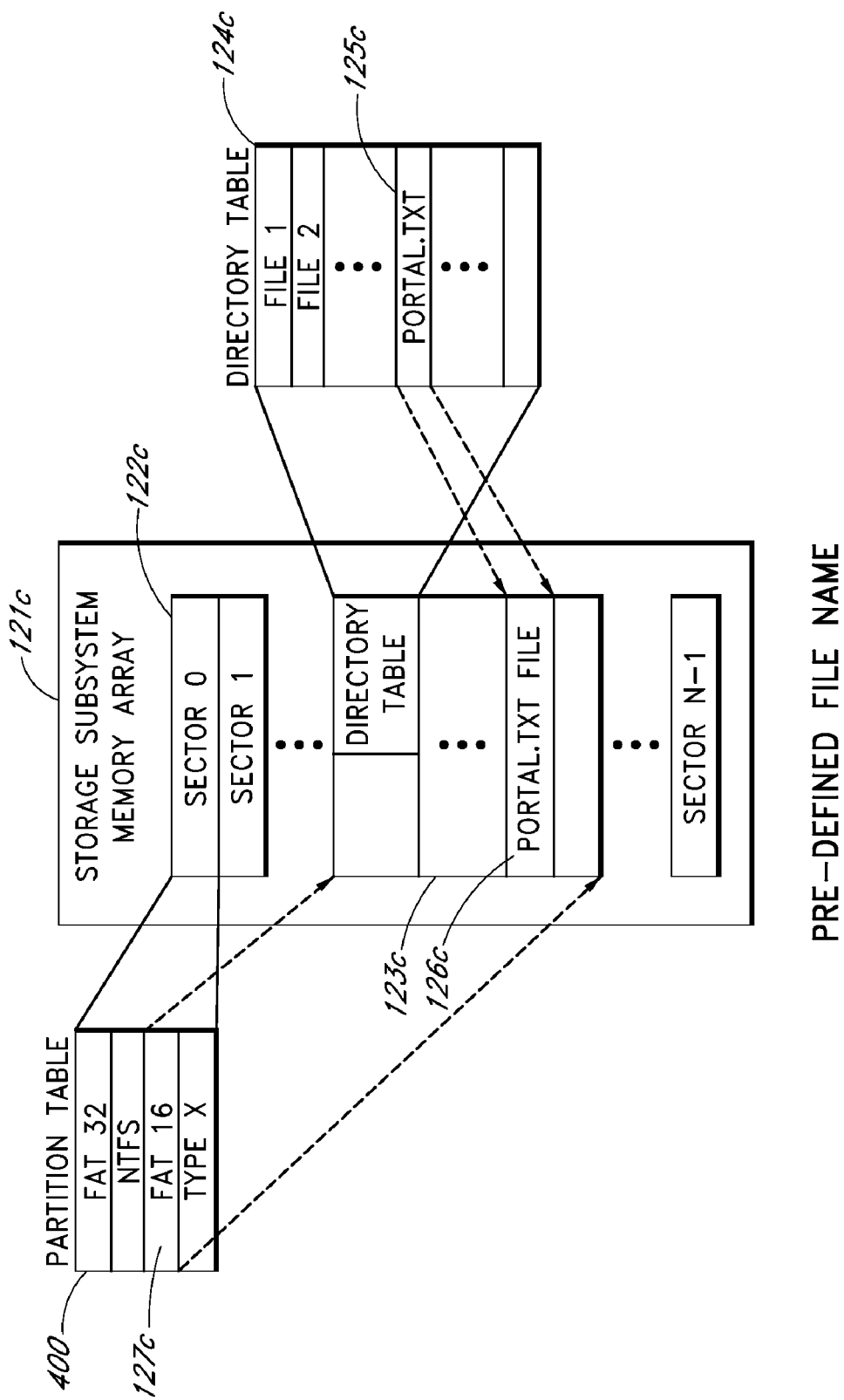
FIGS. 4A, B and C illustrate respective approaches for designating particular sectors/addresses of the storage system for use in performing command portal operations according to specific embodiments.
FIG. 4D illustrates how particular vendor-specific commands can be implied by the use of particular command portal addresses.

Portal Address Discovery Using Predefined File Name—FIG. 4C

FIG. 4C illustrates how predefined file names can be used to enable the host 110 to discover the command portal address or addresses for a particular storage subsystem 120. This method advantageously enables portal-based execution of vendor-specific commands without the need to directly write to or read from specific memory array addresses.

This method uses a predefined file name in a predefined partition 123c to specify the command portal address range. The host (and particularly the command portal API 112) knows the predefined file name 125c and predefined partition 127c a priori. The file 126c is shown in FIG. 4C with the predefined name "portal.txt." To send one or more vendor-specific commands, the command portal API 112 (or application 111) uses the host operating system's "write file" API to perform a write to this file 126c without directly specifying any command portal addresses. The OS device driver 113 translates the file write request into write commands to specific command portal addresses corresponding to the file 126c. Reads may be performed in the same manner. The storage subsystem 120 discovers the command portal address range during its start-up by reading the partition table 400 to find the predefined partition 127c, and then parsing the storage file system partition directory table 124c to find the starting and ending addresses 126c corresponding to the predefined file name 125c. These addresses may represent the upper and lower bounds of the command portal address. The API and/or the storage subsystem may prevent the size of the file from changing or being modified.

To provide a high degree of compatibility with different operating systems, a common partition type, such as FAT16, is preferably used for the predefined partition 123c. If FAT16 is used, the predefined file name can be any name that conforms to FAT16's 8.3 naming convention (maximum of eight characters in the filename and three characters in the extension). The predefined file may be stored in the root directory to obviate the need to traverse the directory structure. For example, if the FAT16 partition of the storage subsystem is designated as the D: drive by the host operating system and the predefined filename is "portal.txt," the file "D:\portal.txt" can be used as command portal address range. This file may be marked as "read-only," "system," and/or "hidden" to protect the file from being deleted or modified.

One benefit of this method, in comparison to the two methods described above, is that no special user privileges are needed. One possible risk is that applications 111 can access the command portal address range, potentially triggering unintended execution of vendor-specific commands. As described below, an appropriate security mechanism can optionally be used to essentially eliminate this risk.

Figure 4D:
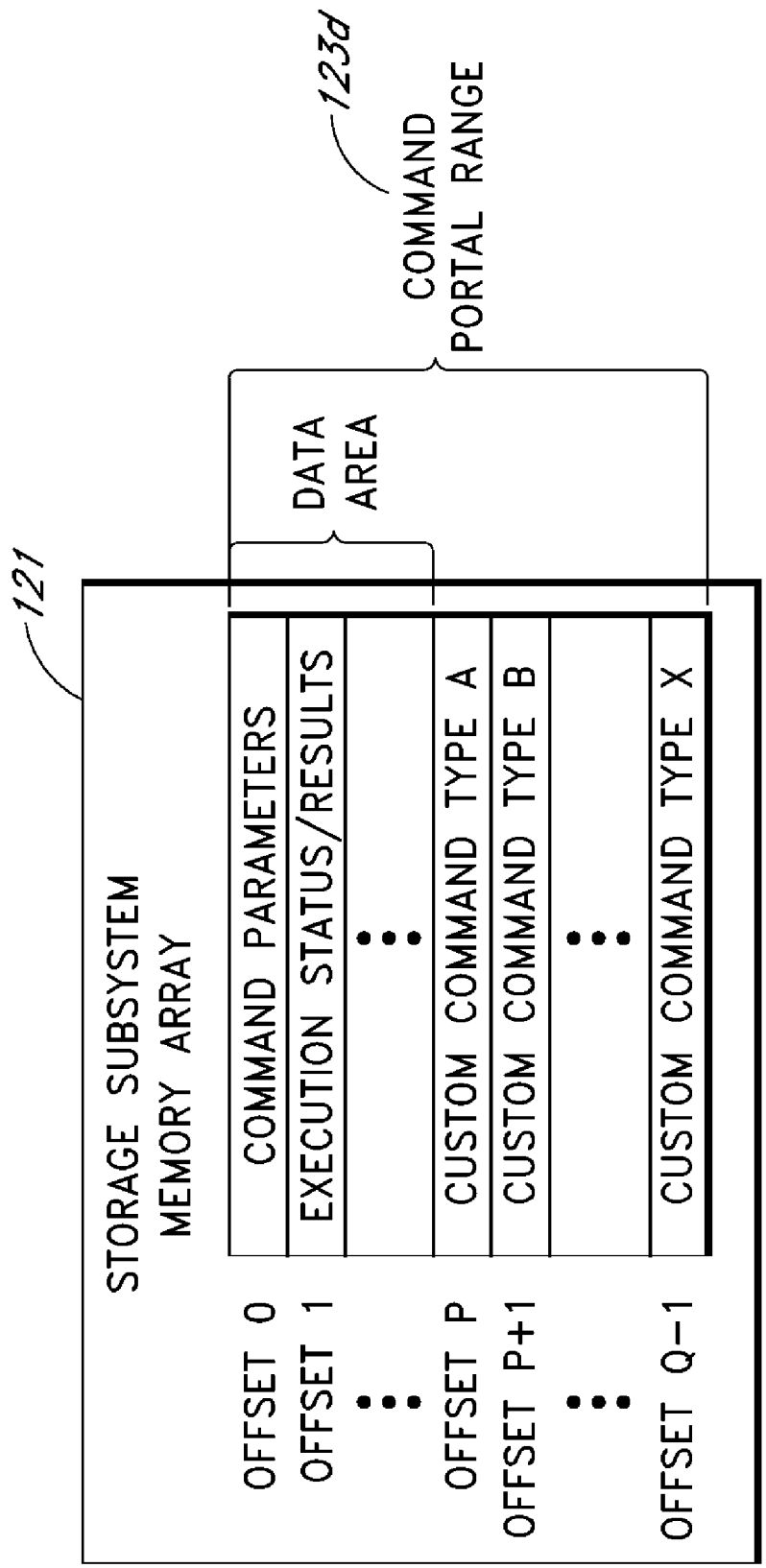

Implied Commands—FIG. 4D

Where multiple portal addresses are used, an "implied command" scheme can be used in which the vendor-specific command is partially or fully specified by the particular command portal address being accessed. FIG. 4D illustrates one example of such a scheme. Specific addresses in the command portal address range 123d are associated with particular vendor-specific commands, with different addresses corresponding to different vendor-specific commands. The data area (offset 0 through P−1) is used to receive parameters of vendor-specific commands and to return execution results of vendor-specific commands. Simple vendor-specific commands that require no parameters are executed by simply writing to a corresponding vendor-specific command offset (e.g., offset P) within the command portal address range 123d. For more complex vendor-specific commands that include one or more parameters, the parameter(s) may be written to the data area (e.g., to offset 0), and a dummy write may then be performed to the address/offset corresponding to the desired vendor-specific command.

The execution results or execution status can be retrieved by the host by requesting the standard OS device driver 113 to perform a read from a corresponding data area (for example, offset 1). The act of reading from this offset implies the command of retrieving status information. The status information may, but need not, actually be stored at the address/offset being read.

The range of addresses used for implied commands may be discovered by the host using the custom partition type method described above, or using any other appropriate method(s). Fixed addresses may also be used.

A hybrid implied/embedded scheme can also be used in which a particular vendor-specific command is specified by the combination of the target address used and information embedded in the write data. As one example, the target write address can specify the type of vendor-specific command to be executed, and the write data can specify one or more parameters of the vendor-specific command. In addition, to provide redundancy, a particular vendor-specific command could be fully specified by the target address used, and also fully specified by the write data.

IV. VALIDATION AND SECURE EXECUTION OF VENDOR-SPECIFIC COMMANDS (FIGS. 5 AND 6)

In addition or as an alternative to using designated command portal addresses as described above, the storage subsystem 120 may implement a command validation process. The purpose of the command validation process is to determine whether received blocks of write data contain properly formed vendor-specific commands. This may be accomplished in-whole or in-part by checking for a predefined data pattern or signature that is unlikely to appear in ordinary write data. The signature can, for example, be a particular pattern of bits (contiguous or non-contiguous), and may but need not be inserted in a predefined location in the write data. Multiple different signatures can be used in a given storage subsystem 120, if desired.

The use of an appropriate signature essentially eliminates the risk of accidental vendor-specific command triggering in which random user data happens to match a properly formatted vendor-specific command. In some embodiments, command validation may be used as the sole method for distinguishing between ordinary write operations and command portal operations. Preferably, however, command validation is used in combination with one or more designated command portal addresses. In comparison to using command validation alone, this combined use of both methods provides greater processing efficiency. This is because command validation processing only needs to be performed when a write occurs to a command portal address.

In comparison to using a command portal address range alone, the combined approach makes it significantly more practical to use the command portal addresses to store ordinary data. Thus, one or more command portal addresses can be created and used without reducing the amount of storage space made available to the host and its applications 111.

In a preferred embodiment, the command validation process is implemented as part of a "command validation and security" protocol that provides for both command validation and protection against malicious command triggering. Malicious command triggering refers generally to malicious attempts to trigger vendor-specific commands to destroy data stored on the storage subsystem. For example, a malicious entity could potentially use a monitoring tool to capture a command sequence, including a validation signature, used to execute a vendor-specific "subsystem erase" command. In the absence of an appropriate security protocol, the malicious entity could later replay this sequence to cause data to be destroyed.

In one embodiment, the command validation and security protocol performs two primary functions: (1) determining whether each vendor-specific command is received from a trusted host system, and (2) determining whether the command is properly formatted and is permissible. These functions may be performed in part by continuously changing handshaking during execution of vendor-specific commands.

Figure 5A:
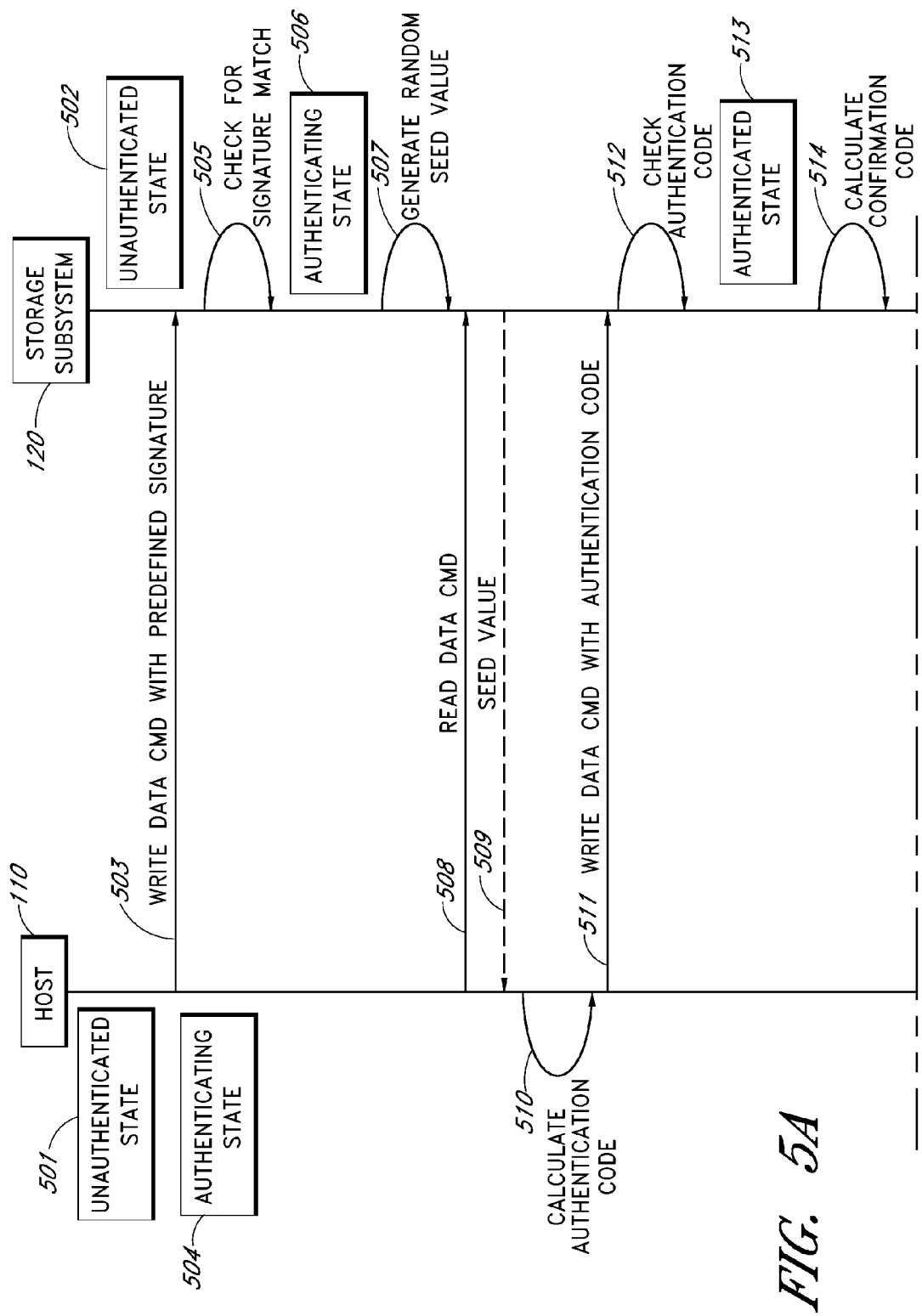
FIGS. 5 (expanded as 5A and 5B) and 6 are flow diagrams illustrating a command validation and security protocol that may be implemented between the host system and the storage subsystem in some embodiments.
Figure 5B:
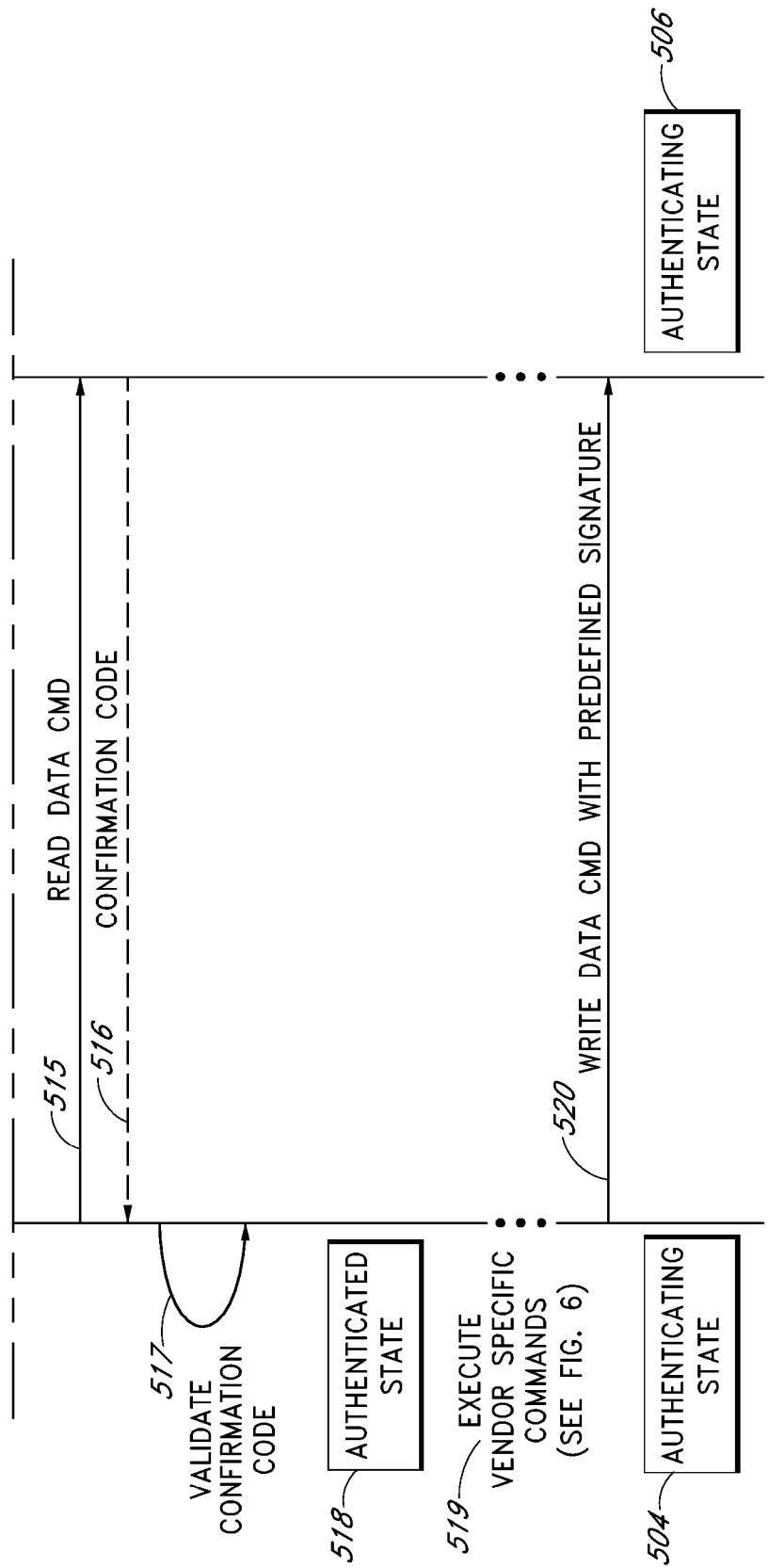
Figure 6:
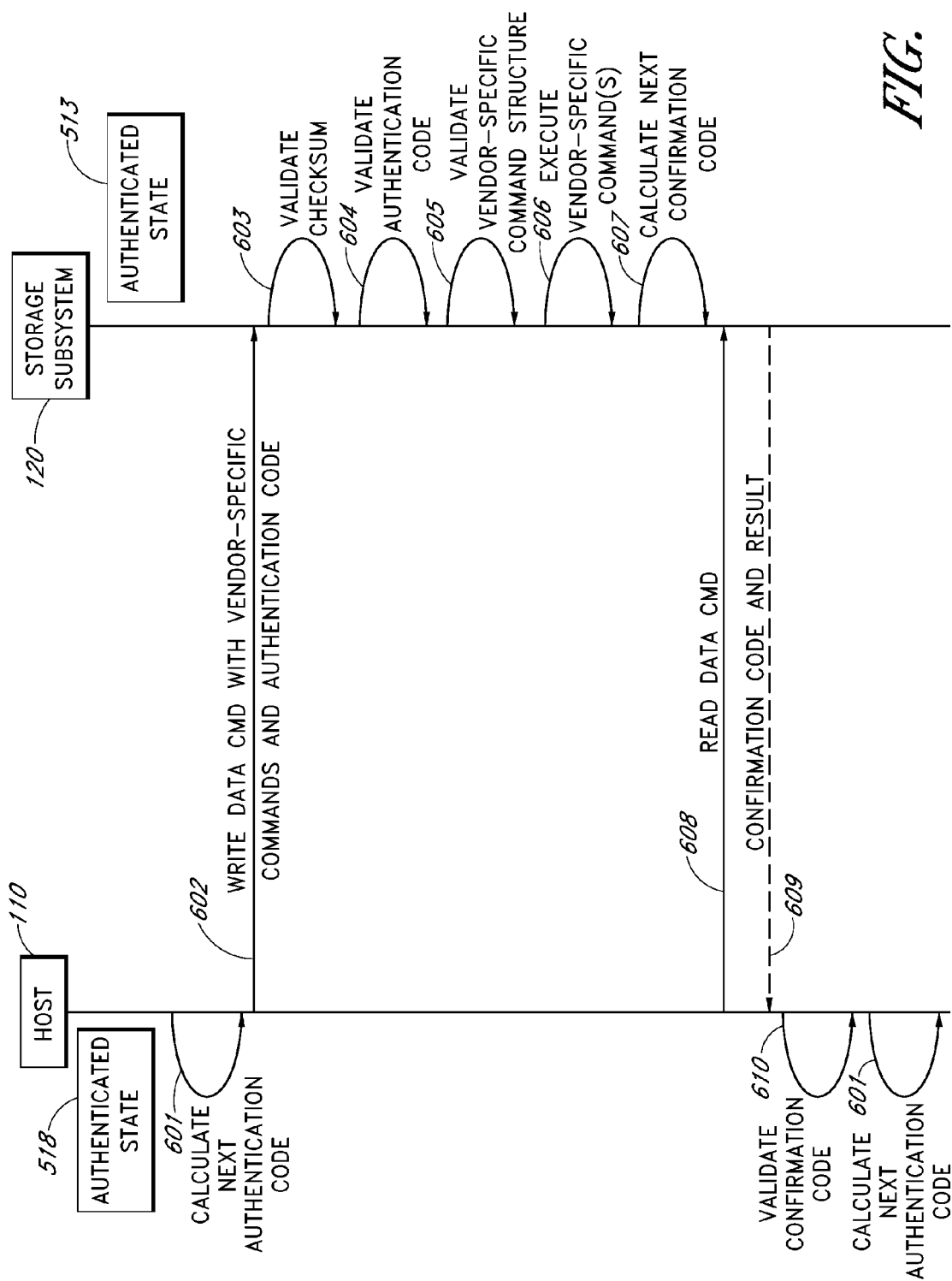
Figure 7:
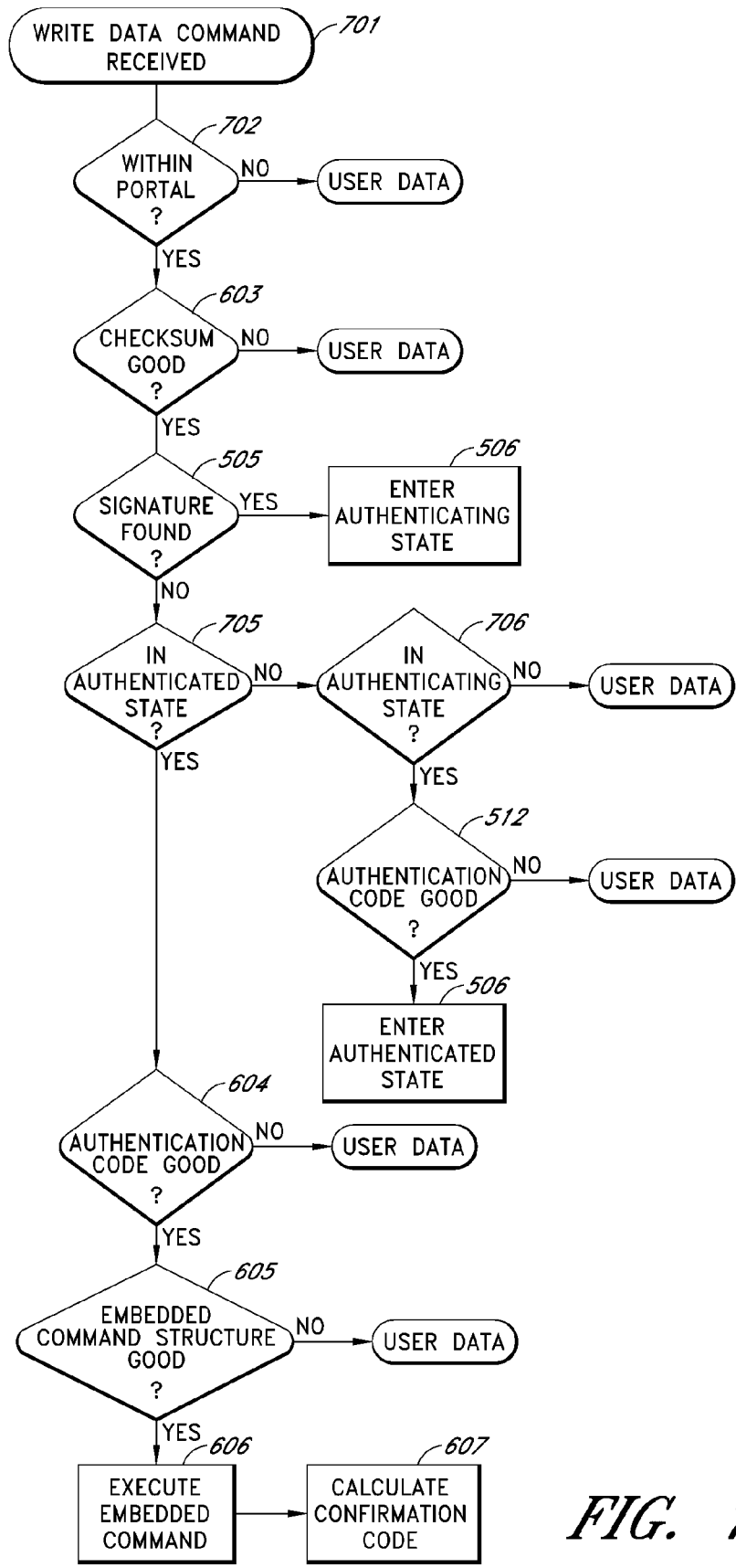
FIG. 7 is a flow chart illustrating decision logic that may be implemented within the storage subsystem for processing write commands in embodiments in which the protocol of FIGS. 5 and 6 is used.

FIG. 5 (split between FIGS. 5A and 5B) and FIG. 6 illustrate sequences of interactions between the host 110 and storage subsystem 120 according to one embodiment of the command validation and security protocol. The host-side tasks illustrated in these drawings may be implemented in the API code of the command portal API 112. Storage subsystem logic for implementing this protocol is illustrated in FIG. 7, and is discussed in the following section.

As will be recognized, numerous variations can be made to the illustrated protocol without impairing its ability to provide command validation and security. Initially, the host system 110 and storage subsystem 120 are in UNAUTHENTICATED states 501 and 502, respectively (FIG. 5A). When the storage subsystem 120 is in the UNAUTHENTICATED state 502, data received via the command portal address range from the host system 110 is checked for a predefined signature. The length of the signature can be any number of bits within at least a 512-byte (or longer) data buffer. The number of 512-byte buffers where the signature is stored can be used as one of the checks for a signature match. In one embodiment, if the signature is not found, the storage subsystem writes the data as user data to the addressed sector; in another embodiment, the storage subsystem discards the data if the signature is not found.

In other embodiments, the "signature" used to enter the AUTHENTICATING state can be a sequence to read a predefined set of sector addresses. With this approach, no potentially destructive write operation needs to be performed. The last read from the sequence will return the "seed" value. A backwards sequence of reads can be used as the sequence for the signature, as such sequences are rare in ordinary storage operations.

At 503 in FIG. 5A, the host system 110 constructs and issues a write data command containing a predefined signature. At state 504, if a second instance of the host API is running which does not have the prior validation/confirmation code, the host system transitions to an AUTHENTICATING state 504. The storage subsystem initially stores the received command data in its buffer 131. At 505, the storage subsystem 120 verifies the predefined signature, and then transitions to the AUTHENTICATING state 506. In this state, the storage subsystem 120 generates a pseudo-random seed value (step 507), and inserts the seed into a read buffer to be read by the host 110. To inhibit reverse engineering, the seed value is preferably inserted into a pseudo-random location in the read buffer. The remainder of the read buffer may be filled with random values. The pseudo-random location may be selected from a predefined set of locations that the host system 110 knows to check based on predefined rules correlating random seed values to pseudo-random locations.

At 508, the host system 110 issues a read data command to retrieve the constructed read buffer. At 509, the storage subsystem 120 returns the read buffer contents, including the seed value. At 510, by following predefined rules, the host system 110 locates the seed value, and based on it generates a rolling authentication code value. At 511, the host system 110 writes the rolling authentication code value to a command portal address calculated according to predefined rules. At 512, upon receiving the write data, the storage subsystem 120, according to predefined rules, independently generates the expected authentication code and command portal address based on the seed value. The storage subsystem 120 then checks whether the generated and received authentication codes match. If they match, the storage subsystem 120 transitions to a AUTHENTICATED state 513 and is ready to accept vendor-specific commands from the host system 110.

To inform the host system of this transition, the storage subsystem 120 at 514 calculates a confirmation code according to predefined rules. At 515 and 516 (FIG. 5B), the host system 110 retrieves the confirmation code, and validates it at 517 according to predefined rules. If validation is successful, the host system 110 enters the AUTHENTICATED state 518. At this point, the host system 110 is also ready to send vendor-specific commands to the storage subsystem 120.

The host application that uses the API to authenticate the command portal may come and go over time, causing the prior validation code to be lost from the host side. However, the storage subsystem does not know that the host API has come and gone, and when the host API comes again, in order to authenticate, the predefined signature will be sent to the storage subsystem again. When this happens, the protocol handshake restarts all over again in the AUTHENTICATING state.

With reference to FIG. 6, when the host system 110 and storage subsystem 120 are in AUTHENTICATED states 518 and 513, to execute vendor-specific commands both sides continue to validate that they are still connected to the same party with which they initially connected. This can be accomplished by using rolling authentication and confirmation codes generated based on the last set of codes using predefined rules. Rolling authentication and confirmation codes can serve as command sequence numbers when multiple vendor-specific commands have been sent by the host system 110.

Checksums may optionally be used to substantially ensure that the vendor-specific command execution requests are well formed. The checksums may be calculated across all data values contained in the write data command or across a predefined number of data values, and can include randomly generated filler bytes. The storage subsystem 120 may verify the checksums to provide an additional level of protection.

At 601 and 602, the host system 110 calculates the next authentication code, and sends one or more vendor-specific commands with the calculated code and checksum. The storage subsystem 120 receives the data, validates the checksum at 603, and validates the authentication code at 604. If validation of the authentication code fails, the storage subsystem 120 will transition to the UNAUTHENTICATED state 502 (refer to FIG. 5). If validation of the authentication code succeeds, the storage subsystem 120 validates the vendor-specific command structure at 605, executes the vendor-specific command(s) at 606, and calculates the next confirmation code at 607. The host system 110 retrieves the confirmation code and results of execution at 608 and 609, and validates it at 610. The host 110 may also calculate the next authentication code for sending one or more additional vendor-specific commands to the storage subsystem 120. In one embodiment, the authentication and confirmation codes are generated based on the last codes used.

If a fixed or discovered command portal address range is used, the storage subsystem 120 may refrain from performing the above-described validation and security tasks for write operations falling outside this range.

When any of the checking at 505, 512, 603, 604, or 605 fails in one embodiment, the storage system 120 treats the received write data command as a request to store user data, and stores this data at the specified location in the command portal address range. Thus, the command portal address range remains available to host applications 111 for ordinary storage operations. In another embodiment, when any of the checking fails, the storage system enters into the UNAUTHENTICATED state directly.

When the storage subsystem 120 is in AUTHENTICATED state 513, it will remain in this state after having executed a user data store request. This is efficient because writing user data to the storage subsystem 120 does not affect the state of vendor-specific command validation and secure execution protocol between the host system 110 and storage subsystem 120.

V. STORAGE SUBSYSTEM LOGIC FOR PROCESSING WRITE COMMANDS (FIG. 7)

FIG. 7 illustrates the decision logic that may be implemented within the storage subsystem's controller 125 for processing write commands according to one embodiment. In this embodiment, it is assumed that the storage subsystem (1) uses the command validation and security protocol depicted in FIGS. 5 and 6, and (2) has a fixed and/or discovered range of command portal addresses that represents a subset of the overall address space. Reference numbers from FIGS. 5 and 6 are reused in FIG. 7 to illustrate corresponding steps.

With reference to FIG. 7, when the storage subsystem 120 receives a write data command at 701, it checks at 702 whether the command was received through the command portal address range. If not, this is a request to store user data, which the storage subsystem 120 executes. If the command has been received through the command portal address range, it may be a request to execute one or more embedded (or possibly implied) vendor-specific commands. In this case, additional checking is performed to determine whether the request complies with the command validation and security protocol.

According to the protocol illustrated in FIG. 5 and FIG. 6, the storage subsystem 120 validates the checksum at 603. If this validation fails, the received write data command is treated as a request to store user data, which the storage subsystem 120 executes. Otherwise, the storage subsystem 120 checks for a predefined signature at 505. If a valid signature is found, the storage subsystem 120 transitions to the AUTHENTICATING state 506.

If no signature is found at 505, the storage subsystem 120 checks at 705 whether it is in the AUTHENTICATED state. If not, the storage subsystem 120 checks at 706 whether it is in the AUTHENTICATING state. If not, the storage subsystem 120 treats the received write data command as a request to store user data, and executes this request. If the storage subsystem 120 is in the AUTHENTICATED state and the authentication code has been validated at 512, the storage subsystem 120 transitions to the AUTHENTICATED state 506. Otherwise, if the authentication code is invalid, the storage subsystem 120 treats the received write data command as a request to store user data, and executes this request.

If at 705 the storage subsystem 120 is in the AUTHENTICATED state, at 604 it validates the authentication code. If this validation attempt fails, the storage subsystem 120 treats the received write data command as a request to store user data, and executes this request. Otherwise, the storage subsystem 120 validates the vendor-specific command structure at 605. If this validation attempt fails, the storage subsystem 120 treats the received write data command as a request to store user data, and executes this request. Otherwise, the storage system 120 treats the received write data command as a valid request to execute one or more vendor-specific commands, and executes this request at 606 without writing the data to the target location. At 607, the storage subsystem 120 calculates the next confirmation code.

VI. READS FROM COMMAND PORTAL ADDRESSES (FIG. 8)

In some embodiments, the storage subsystem 120 enables the host 110 to obtain the execution results of an embedded (or implied) custom command by reading from a command portal address using a standard read command. Unlike standard write commands, a signature cannot be included in a standard read command to signify the intention to perform a command portal operation. Thus, in embodiments in which the command portal addresses are used both for command portal operations and to store user data, some other mechanism is needed to distinguish between reads of command status information and reads of user data.

In one embodiment, the storage subsystem 120 processes read commands addressed to command portal addresses as follows. If the received read command does not immediately follow a request to execute one or more vendor-specific commands, the storage subsystem 120 returns the data stored at the specified command portal address. Otherwise, the storage subsystem 120 returns the execution results of the immediately preceding vendor-specific command or commands. Thus, the read command itself need not indicate whether it is a read of user data versus a read of command status information.

Because of multitasking within the host's operating system, read requests from different applications 111 can potentially be executed out of sequence, resulting in vendor-specific command execution status data being returned to an application 111 expecting user data. Similarly, user data may be returned to an application 111 expecting status information. This problem can be avoided by not allowing user data to be stored in the command portal address range, or at least a particular portion of this range used for command portal reads. For example, a particular address (e.g., sector 1) can be used as a dedicated command portal address, such that all reads of this address are treated as requests to retrieve execution results.

Figure 8A:
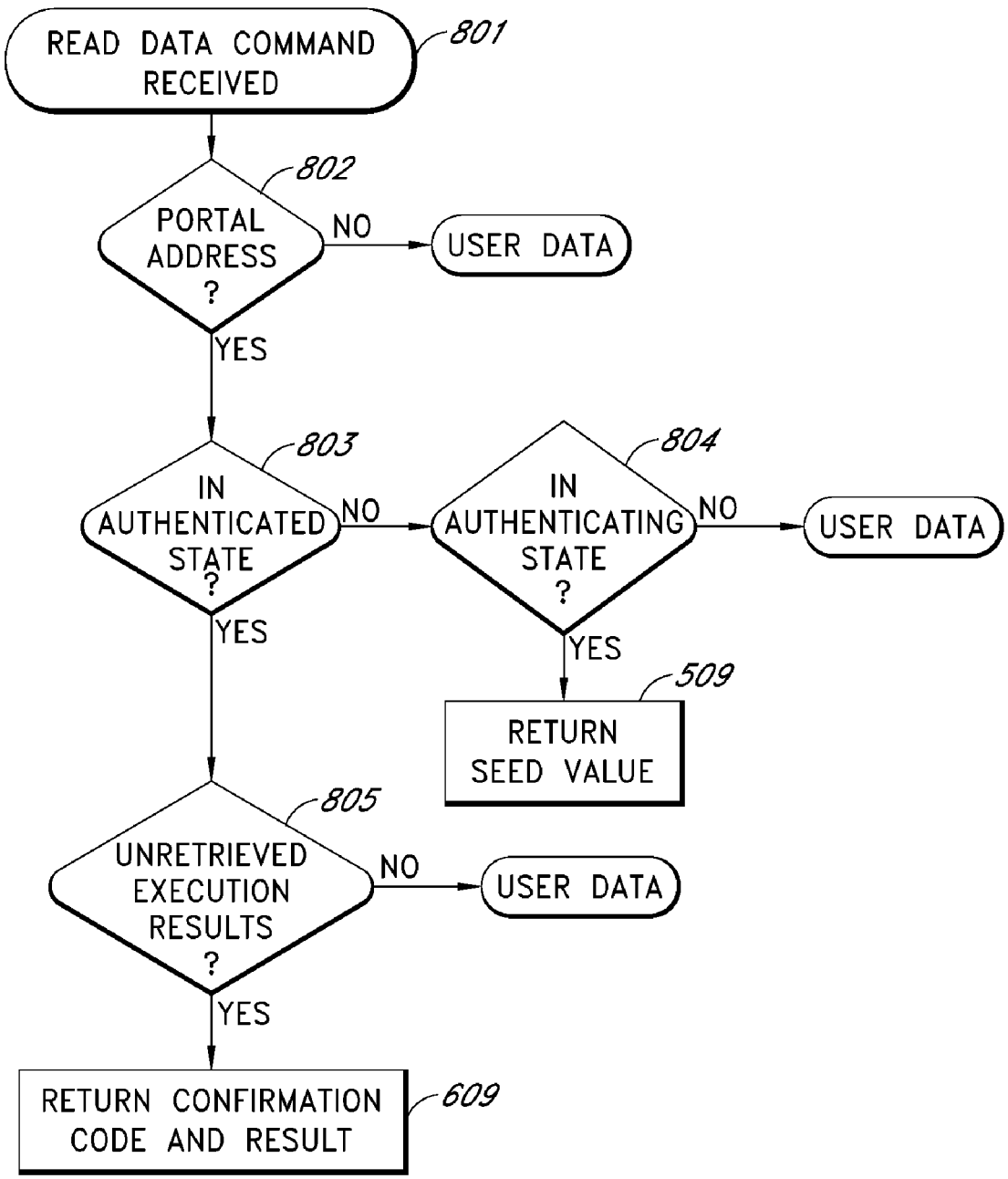
FIGS. 8A and 8B illustrate respective methods by which the storage subsystem may process read commands so as to distinguish between ordinary reads and command portal reads, particularly in embodiments in which the non-standard commands may alternatively be implied by the particular target addresses used the protocol of FIGS. 5 and 6 is used.
Figure 8B:
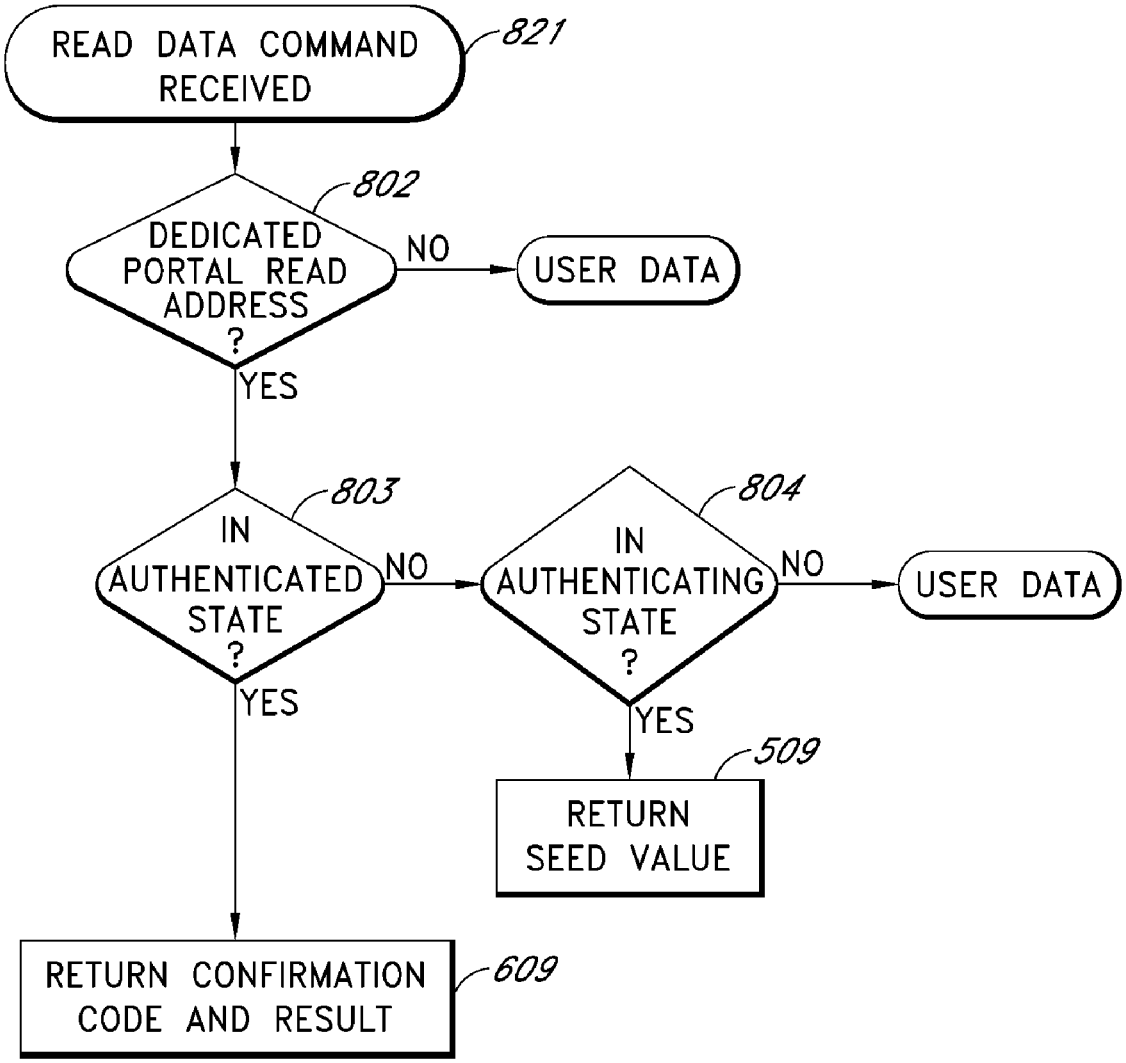

This "out-of-sequence reads" issue can also be addressed without reducing the storage space available for storing user data. FIGS. 8A and 8B illustrate two methods by which this may be done. More specifically, each figure illustrates a respective method by which the storage subsystem 120 may process read commands so as to distinguish between ordinary reads and command portal status reads.

The first method, shown in FIG. 8A, may be used when a predefined filename is used to specify the command portal address range (see FIG. 4C, discussed above). With this method, all applications 111 that wish to execute vendor-specific commands must do so through the command portal API 112; as a result, access to command portal address range is under complete control of the command portal API 112, and the problem of out-of-sequence user data retrieval requests is avoided. Accordingly, when a read data command is received at 801, it is a timely request either to retrieve user data or to retrieve results of execution of one or more prior vendor-specific commands.

In one embodiment, the portal address to read the result is a pre-calculated address based on the expected confirmation code. Therefore a sequenced read to the expected sector/portal address signifies that it is a status read and not a user data read. In another embodiment, the read sector address is specified in the embedded custom command so that a chosen address that is not conflicting can be used. A read to that chosen address immediately following the custom command is a status read rather than a user data read.

At 802 in FIG. 8A, the storage subsystem 120 checks whether the command was received through the command portal address range. If not, the storage system 120 executes the read command as an ordinary request to retrieve user data. Otherwise, at 803, the storage subsystem 120 checks whether it is in the AUTHENTICATED state. If not, at 804 the storage subsystem 120 checks whether it is in the AUTHENTICATING state. If not, the storage system 120 executes the read command as an ordinary request to retrieve user data. Otherwise, at 509, the storage subsystem 120 returns a randomly generated seed value (refer to FIG. 5). If at 803 the storage subsystem 120 is in the AUTHENTICATED state, it checks at 805 whether one or more vendor-specific commands have been executed without a subsequent request to retrieve execution results. If the check at 805 fails, the storage system 120 executes the read command as an ordinary request to retrieve user data. Otherwise, this is a request to retrieve execution results of prior vendor-specific command or commands. With reference to FIG. 6 and FIG. 8A, at 609 the storage subsystem returns the execution results and the next confirmation code.

FIG. 8B illustrates an alternative method in which the host retrieves custom-command execution results by reading from a pre-defined (fixed) command portal address, such as an address that is not normally used by the operating system. As discussed above in connection with FIG. 4A, examples of fixed addresses that can be used include sector 0, sector 1, and the last sector of the memory array. The fixed address may be used only for portal read operations, or may also be used for portal write operations (i.e., transmissions of embedded commands). Because the selected predefined address is normally not used by the operating system, the location is under complete control of the command portal API 112 and the problem of out-of-sequence read data commands is avoided. In the particular example shown in FIG. 8B, it is assumed that the fixed address is available for the storage of user data; thus, checking is performed to determine whether reads of this address are user data reads versus status reads.

With reference to FIG. 8B, when a "read data" command is received at 821, it is assumed to be a timely request either to retrieve user data or to retrieve results of execution of prior vendor-specific command or commands. At 802, the storage subsystem 120 checks whether the command was received through a dedicated portal address used for reading execution status information. If not, the storage subsystem 120 executes the read command as an ordinary request to retrieve user data. Otherwise, at 803, the storage subsystem 120 checks whether it is in the AUTHENTICATED state. If not, at 804, the storage subsystem 120 checks whether it is in the AUTHENTICATING state. If not, the storage subsystem 120 executes the read command as an ordinary request to retrieve user data. Otherwise, at 509, the storage subsystem 120 returns a randomly generated seed value (refer to FIG. 5). If, at 803, the storage subsystem 120 is in the AUTHENTICATED state, the storage subsystem treats the read command as a request to retrieve results of execution of prior vendor-specific command or set of commands. With reference to FIG. 6 and FIG. 8B, at 609 the storage subsystem returns the execution results and the next confirmation code.

VII. CONCLUSION

The various portal-related steps described herein as being performed by the host system 110 may be embodied in, and performed under the control of, executable code of the command portal API 112, or executable code of an application 111 that implements this API. Such executable code may be stored on an appropriate computer-readable medium (e.g., magnetic disk drives, solid state RAM devices, optical disks, etc.), and may be executed by one or more processor devices of the host system 110. Although some steps may be described in this disclosure as being performed by a particular host software component (such as the command portal API or an operating system component), it is understood that such tasks are performed by the host executing code of the referenced component. In some embodiments, the command portal API 112 may be omitted, in which case an application 111 may be written to perform the tasks that are described herein as being performed by the command portal API.

The various steps described herein as being performed by the storage subsystem 120 may be performed by, or under the control of, the storage subsystem's controller 125. As mentioned above, these steps may be implemented in firmware executed by the controller 125, in application-specific hardware of the controller 125, or both.

Although described primarily in the context of a storage subsystem that includes a non-volatile memory array arranged into sectors, the invention is not so limited. For example, in some embodiments, the storage subsystem's memory array may include or consist of volatile memory elements, and/or may be arranged in units other than sectors. In addition, as mentioned above, the solid-state non-volatile memory elements can be replaced or supplemented with magnetic disk drives or another type of storage device.

While certain embodiments of the inventions have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the inventions. The invention is defined by the accompanying claims.

What is claimed is:

1. A non-volatile storage subsystem that processes storage access commands received from a host system, the non-volatile storage subsystem comprising:
 a memory array; and
 a controller for processing storage access commands communicated in accordance with a storage interface that includes a command set, the controller configured to:
  receive a write data command and an associated block of write data from the host system, the write data command associated with an address that specifies at least one target sector of the memory array;
  determine whether the storage subsystem is in an authenticated state with respect to the host system;

when it is determined that the storage subsystem is in the authenticated state with respect to the host system:
  determine whether the write data command was received from the host system with respect to which the storage subsystem is in the authenticated state; and
  in response to determining that the write data command was received from the host system with respect to which the storage subsystem is in the authenticated state:
    extract an embedded command from the block of write data and determine whether the embedded command is valid; and
    in response to determining that the embedded command is valid, execute the embedded command within the non-volatile storage subsystem, wherein the embedded command is not included in the command set; and
  when it is determined that the storage subsystem is not in the authenticated state with respect to the host system, execute the write data command.

2. The non-volatile storage subsystem of claim 1, wherein the controller is further configured to:
  receive a read data command from the host system, the read command associated with a target address of the memory array; and
  at least partly in response to determining that the target address is configured to return an execution result of the embedded command, transmit the execution result of the embedded command to the host system.

3. The non-volatile storage subsystem of claim 1, wherein the controller is further configured to extract a range of one or more addresses used by the host system to send embedded commands to the non-volatile storage subsystem.

4. The non-volatile storage subsystem of claim 3, wherein the controller is further configured to determine whether the address falls within the range of one or more addresses used by the host system to send embedded commands to the non-volatile storage subsystem.

5. The non-volatile storage subsystem of claim 3, wherein the controller is further configured to extract the range from a file or custom partition in the memory array.

6. The non-volatile storage subsystem of claim 1, wherein the controller is further configured to determine whether the address is configured for executing the type of embedded commands to which the embedded command belongs.

7. The non-volatile storage subsystem of claim 1, wherein the controller is further configured to determine whether the block of write data includes multiple embedded commands.

8. The non-volatile storage subsystem of claim 1, wherein the embedded command is at least partially specified by the address.

9. The non-volatile storage subsystem of claim 1, in combination with said host system, wherein the host system is configured to send the write data command to the non-volatile storage subsystem, at least in part, via execution of Application Program Interface (API) code on the host system, the API code providing an interface between a host application and a driver configured to support the command set.

10. The non-volatile storage subsystem of claim 1, in combination with said host system, wherein the host system is configured to send the write data command to the non-volatile storage subsystem by invoking a "write file" API of a host operating system running on the host system.

11. The non-volatile storage subsystem of claim 1, wherein:
  the controller is further configured to receive multiple write data commands and associated blocks of write data from a plurality of host systems; and
  an authentication code included in a block of write data further identifies the block of write data as containing an embedded command received from a particular host system from the plurality of host systems.

12. A method performed by a non-volatile storage subsystem that is configured to process storage access commands received from a host system, comprising:
  receiving a write data command and an associated block of write data from the host system, the write data command associated with an address that specifies at least one target sector for storing the write data in the non-volatile storage subsystem;
  determining whether the storage subsystem is in an authenticated state with respect to the host system;
  when it is determined that the storage subsystem is in the authenticated state with respect to the host system:
    determining whether the write data command was received from the host system with respect to which the storage subsystem is in the authenticated state; and
    in response to determining that the write data command was received from the host system with respect to which the storage subsystem is in the authenticated state:
      extracting an embedded command from the block of write data and determining whether the embedded command is valid; and
      in response to determining that the embedded command is valid, executing the embedded command, wherein the embedded command is not included in a command set being supported by the non-volatile storage subsystem; and
  when it is determined that the storage subsystem is not in the authenticated state with respect to the host system, executing the write data command.

13. The method of claim 12, further comprising, prior to receiving the block of write data with the embedded command, establishing a secure channel for receiving write data commands from a particular host system among a plurality of host systems.

14. The method of claim 13, further comprising establishing a plurality of secure channels, wherein each secure channel is established for each host system among the plurality of host systems.

15. The method of claim 12, wherein determining whether the write data command was received from the same host system as the host system with respect to which the storage subsystem is in the authenticated state comprises in response to determining that the block of write data includes an authentication code that identifies the block of write data as containing the embedded command, validating the authentication code by determining whether the authentication code matches an expected authentication code.

16. The method of claim 13, wherein the authentication code is calculated based on a confirmation code received from the storage subsystem.

* * * * *